US007689485B2

(12) United States Patent
Kanekar et al.

(10) Patent No.: US 7,689,485 B2
(45) Date of Patent: Mar. 30, 2010

(54) GENERATING ACCOUNTING DATA BASED ON ACCESS CONTROL LIST ENTRIES

(75) Inventors: Bhushan Mangesh Kanekar, San Jose, CA (US); Venkateshwar Rao Pullela, San Jose, CA (US); Dileep Kumar Devireddy, San Jose, CA (US); Suresh Gurajapu, Santa Clara, CA (US); Gyaneshwar S. Saharia, Cupertino, CA (US); Atul Rawat, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1835 days.

(21) Appl. No.: 10/630,178

(22) Filed: Jul. 29, 2003

(65) Prior Publication Data

US 2004/0172346 A1 Sep. 2, 2004

Related U.S. Application Data

(63) Continuation-in-part of application No. 10/215,719, filed on Aug. 10, 2002, now Pat. No. 7,103,708.

(51) Int. Cl.
*G06Q 99/00* (2006.01)
(52) U.S. Cl. ........................... 705/35; 718/104; 399/79; 399/1
(58) Field of Classification Search ................. 718/104; 399/79, 1; 705/1; 707/9
See application file for complete search history.

(56) References Cited

U.S. PATENT DOCUMENTS 3,648,254 A   3/1972   Beausoleil
4,296,475 A   10/1981  Nederlof et al.
4,791,606 A   12/1988  Threewitt et al.

(Continued)

FOREIGN PATENT DOCUMENTS

GB        2176920 A     1/1987

OTHER PUBLICATIONS

Definition of "accounting" (or 'financial accounting') from Meriam-Webster Dictionary, 2 pages printed on Oct. 24, 2007.*

(Continued)

*Primary Examiner*—Mary Cheung
*Assistant Examiner*—Behrang Badii
(74) *Attorney, Agent, or Firm*—The Law Office of Kirk D. Williams

(57) ABSTRACT

Methods, apparatus, and other mechanisms are disclosed for generating accounting or other data based on that indicated in access control lists or other specifications, and typically using associative memory entries in one or more associative memory banks and/or memory devices. One implementation identifies an access control list including multiple access control list entries, with a subset of these access control list entries identifying accounting requests. Accounting mechanisms are associated with each of said access control list entries in the subset of access control list entries identifying accounting requests. An item is identified, and a corresponding accounting mechanism is updated. In one implementation, the item includes at least one autonomous system number. In one implementation, at least one of the accounting mechanisms is associated with at least two different access control list entries in the subset of access control list entries identifying accounting requests.

9 Claims, 35 Drawing Sheets

U.S. PATENT DOCUMENTS

| | | | |
|---|---|---|---|
| 4,996,666 A | 2/1991 | Duluk, Jr. | |
| 5,088,032 A | 2/1992 | Bosack | |
| 5,267,190 A | 11/1993 | Easley et al. | |
| 5,319,763 A | 6/1994 | Ho et al. | |
| 5,339,076 A | 8/1994 | Jiang | |
| 5,383,146 A | 1/1995 | Threewitt | |
| 5,404,482 A | 4/1995 | Stamm et al. | |
| 5,421,011 A * | 5/1995 | Camillone et al. | 718/104 |
| 5,428,565 A | 6/1995 | Shaw | |
| 5,440,715 A | 8/1995 | Wyland | |
| 5,450,351 A | 9/1995 | Heddes | |
| 5,481,540 A | 1/1996 | Huang | |
| 5,515,370 A | 5/1996 | Rau | |
| 5,684,954 A | 11/1997 | Kaiserswerth et al. | |
| 5,740,171 A | 4/1998 | Mazzola et al. | |
| 5,748,905 A | 5/1998 | Hauser et al. | |
| 5,802,567 A | 9/1998 | Liu et al. | |
| 5,841,874 A | 11/1998 | Kempke et al. | |
| 5,842,040 A | 11/1998 | Hughes et al. | |
| 5,852,569 A | 12/1998 | Srinivasan et al. | |
| 5,898,689 A | 4/1999 | Kumar et al. | |
| 5,917,821 A * | 6/1999 | Gobuyan et al. | 370/392 |
| 5,920,886 A | 7/1999 | Feldmeier | |
| 5,930,359 A | 7/1999 | Kempke et al. | |
| 5,951,651 A * | 9/1999 | Lakshman et al. | 709/239 |
| 5,956,336 A | 9/1999 | Loschke et al. | |
| 5,978,885 A | 11/1999 | Clark, II | |
| 6,000,008 A | 12/1999 | Simcoe | |
| 6,041,389 A | 3/2000 | Rao | |
| 6,047,369 A | 4/2000 | Colwell et al. | |
| 6,061,368 A | 5/2000 | Hitzelberger | |
| 6,069,573 A | 5/2000 | Clark, II et al. | |
| 6,081,440 A | 6/2000 | Washburn et al. | |
| 6,091,725 A | 7/2000 | Cheriton et al. | |
| 6,097,724 A | 8/2000 | Kartalopoulos | |
| 6,134,135 A | 10/2000 | Andersson | |
| 6,137,707 A | 10/2000 | Srinivasan et al. | |
| 6,141,738 A | 10/2000 | Munter et al. | |
| 6,148,364 A | 11/2000 | Srinivasan et al. | |
| 6,151,323 A * | 11/2000 | O'Connell et al. | 370/395.53 |
| 6,154,384 A | 11/2000 | Nataraj et al. | |
| 6,175,513 B1 | 1/2001 | Khanna | |
| 6,181,698 B1 | 1/2001 | Hariguchi | |
| 6,199,140 B1 | 3/2001 | Srinivasan et al. | |
| 6,219,748 B1 | 4/2001 | Srinivasan et al. | |
| 6,236,658 B1 | 5/2001 | Essbaum et al. | |
| 6,237,061 B1 | 5/2001 | Srinivasan et al. | |
| 6,240,003 B1 | 5/2001 | McElroy | |
| 6,240,485 B1 | 5/2001 | Srinivasan et al. | |
| 6,243,667 B1 | 6/2001 | Kerr et al. | |
| 6,246,601 B1 | 6/2001 | Pereira | |
| 6,285,378 B1 | 9/2001 | Duluk, Jr. | |
| 6,289,414 B1 | 9/2001 | Feldmeier et al. | |
| 6,295,576 B1 | 9/2001 | Ogura et al. | |
| 6,307,855 B1 | 10/2001 | Hariguchi | |
| 6,308,219 B1 | 10/2001 | Hughes | |
| 6,317,350 B1 | 11/2001 | Pereira et al. | |
| 6,374,326 B1 | 4/2002 | Kansal et al. | |
| 6,377,577 B1 | 4/2002 | Bechtolsheim et al. | |
| 6,389,506 B1 | 5/2002 | Ross et al. | |
| 6,430,190 B1 | 8/2002 | Essbaum et al. | |
| 6,434,662 B1 | 8/2002 | Greene et al. | |
| 6,467,019 B1 | 10/2002 | Washburn | |
| 6,498,912 B1 * | 12/2002 | Leni et al. | 399/79 |
| 6,526,474 B1 | 2/2003 | Ross | |
| 6,535,951 B1 | 3/2003 | Ross | |
| 6,546,391 B1 | 4/2003 | Tsuruoka | |
| 6,577,520 B1 | 6/2003 | Mick | |
| 6,580,712 B1 * | 6/2003 | Jennings et al. | 370/392 |
| 6,597,595 B1 | 7/2003 | Ichiriu et al. | |
| 6,598,034 B1 * | 7/2003 | Kloth | 706/47 |
| 6,606,681 B1 | 8/2003 | Uzun | |
| 6,651,096 B1 | 11/2003 | Gai et al. | |
| 6,658,002 B1 | 12/2003 | Ross et al. | |
| 6,707,692 B2 | 3/2004 | Hata | |
| 6,715,029 B1 | 3/2004 | Trainin et al. | |
| 6,717,946 B1 | 4/2004 | Hariguchi et al. | |
| 6,738,862 B1 | 5/2004 | Ross et al. | |
| 6,775,737 B1 | 8/2004 | Warkhede et al. | |
| 6,798,777 B1 * | 9/2004 | Ferguson et al. | 370/392 |
| 6,831,893 B1 * | 12/2004 | Ben Nun et al. | 370/235 |
| 6,970,462 B1 * | 11/2005 | McRae | 370/392 |
| 7,120,731 B1 | 10/2006 | Bhugra et al. | 711/108 |
| 7,177,978 B2 * | 2/2007 | Kanekar et al. | 711/108 |
| 7,215,637 B1 * | 5/2007 | Ferguson et al. | 370/230.1 |
| 7,227,842 B1 | 6/2007 | Ji et al. | 370/235 |
| 2001/0038554 A1 | 11/2001 | Takata et al. | |
| 2001/0043614 A1 * | 11/2001 | Viswanadham et al. | 370/469 |
| 2002/0126672 A1 * | 9/2002 | Chow et al. | 370/392 |
| 2002/0150093 A1 * | 10/2002 | Ott et al. | 370/389 |
| 2003/0005146 A1 | 1/2003 | Miller et al. | |
| 2003/0223259 A1 | 12/2003 | Roth | |
| 2003/0231631 A1 | 12/2003 | Pullela | |
| 2004/0030802 A1 | 2/2004 | Eatherton et al. | |
| 2004/0030803 A1 | 2/2004 | Eatherton et al. | |
| 2006/0039374 A1 * | 2/2006 | Belz et al. | 370/389 |

OTHER PUBLICATIONS

Definition of "cost accounting" from Meriam-Webster Dictionary, 2 pages printed on Oct. 24, 2007.*

Stephen Doster, Beyond call accounting: network accounting!, Mar. 1997, Teleconnect, V15, n3, p127(1).*

U.S. Appl. No. 10/630,174, filed Jul. 29, 2003, Kanekar et al.

U.S. Appl. No. 10/630,176, filed Jul. 29, 2003, Pullela et al.

U.S. Appl. No. 10/355,694, filed Jan. 31, 2003, Priyadarshan et al.

U.S. Appl. No. 10/215,719, filed Aug. 10, 2002, Eatherton et al.

U.S. Appl. No. 10/215,700, filed Aug. 10, 2002, Eatherton et al.

U.S. Appl. No. 10/651,179, filed Aug. 28, 2003, Marimuthu et al.

Tong-Bi Pei and Charles Zukowski, "VLSI Implementation of Routing Tables: Tries and CAMS," Networking in the Nineties, Proceedings of the Annual Joint Conference of the Computer and Communications Societies, New York, Apr. 7, 1991, pp. 515-524, vol. 2, Conf. 10.

Anthony Mcauley and Paul Francis, "Fast Routing Table Lookup Using CAMs," Networking: Foundation for the Future, Proceedings of the Annual Joint Conference of the Computer and Communications Societies, Los Alamitos, Mar. 28, 1993, pp. 1382-1391, vol. 2, Conf 12.

Jon P. Wade and Charles G. Sodini, "A Ternary Content Addressable Search Engine," IEEE Journal of Solid-State Circuits, vol. 24, No. 4, Aug. 1989, pp. 1003-1013.

Teuvo Kohonen, Content-Addressable Memories, 1987, pp. 128-129 and 142-144, Springer-Verlang, New York.

Brian DiPert, ed., "Special-purpose SRAMs Smooth the Ride," EDN, Jun. 24, 1999, pp. 93-104.

"What is a CAM (Content-Addressable Memory)?," Application Brief AB-N6, Rev. 2a, Music Semiconductors, Milpitas, CA, Sep. 30, 1998, 4 pages.

"Reading Out the Valid LANCAM Memory Entries," Application Brief AB-N4, Rev. 1a, Music Semiconductors, Milpitas, CA, Sep. 30, 1998, 4 pages.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using Music Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

Aristides Efthymiou and Jim Garside, "An Adaptive Serial-Parallel CAM Architecture for Low-Power Cache Blocks," Low Power Electronics And Design, 2002. ISLPED '02. Proceedings Of The 2002 International Symposium on Aug. 12-14, 2002, Aug. 12, 2002, pp. 136-141, IEEE, Piscataway, NJ, USA.

* cited by examiner

POLICY MAP
600

```
route-map my_map sequence_1
match ip address ACL101
set ip next-hop 192.10.10.1 route-map my_map sequence_2
match ip address ACL102
set ip next-hop 198.20.20.1 ip access-list ACL101 deny ip 10.0.0.0 0.255.255.255 any
ip access-list ACL101 permit ip any any ip access-list ACL102 permit ip any 20.0.0.0 0.255.255.255
ip access-list ACL102 deny ip any any int f3/1
ip policy route-map my map
```

FIGURE 6A

BLOCK/
ASSOCIATIVE
MEMORY 1
ENTRIES
621

```
10.*.*.*   *.*.*.*   FORCE NO-HIT = 1   PRIORITY = 1
*.*.*.*    *.*.*.*   FORCE NO-HIT = 0   PRIORITY = 1
```

```
*.*.*.*    20.*.*.*  FORCE NO-HIT= 0    PRIORITY = 2
*.*.*.*    *.*.*.*   FORCE NO-HIT= 1    PRIORITY = 2
```

BLOCK/
ASSOCIATIVE
MEMORY 2
ENTRIES
622

FIGURE 6B

ACCESS
CONTROL
LIST
800

```
route-map my_map sequence 1
match ip address ACL101
set ip next-hop 192.10.10.1
801 — set billing-1 route-map my_map sequence_2
match ip address ACL102
set ip next-hop 198.20.20.1
802 — set billing-2 ip access-list ACL101 permit ip  10.0.0.0 0.255.255.255 any
803 { ip access-list ACL101 permit ip  11.0.0.0 0.255.255.255 any
      ip access-list ACL101 deny   ip  12.0.0.0 0.255.255.255 any
      ip access-list ACL101 permit ip any any 804 { ip access-list ACL102 permit ip any 20.0.0.0 0.255.255.255
      ip access-list ACL102 deny ip any any int f3/1
ip policy route-map my_map
```

FIGURE 8A

ACCESS
CONTROL
LIST
915

```
route-map my_map sequence_1
match ip address ACL101
set ip next-hop 192.10.10.1
set billing-1 route-map my_map sequence_2
match ip address ACL102
set encrypt
set billing-2
```

TYPE A,
FEATURE 1
916
```
ip access-list ACL101 permit ip   10.10.*.*    20.1.1.*
ip access-list ACL101 permit ip   10.10.*.*    20.1.*.*
ip access-list ACL101 permit ip   10.10.1.*    20.2.1.1
ip access-list ACL101 deny   ip   *. *.*.*     *.*.*.*
```

TYPE A,
FEATURE 2
917
```
ip access-list ACL102 permit ip   10.10.1.*    20.1.1.2
ip access-list ACL102 permit ip   10.10.1.*    20.1.2.2
ip access-list ACL102 permit ip   10.20.1.2    *.*.*.*
ip access-list ACL102 deny   ip   *. *.*.*     *.*.*.*
```

```
int f3/1
ip policy route-map my_map
```

FIGURE 9B

SECURITY
COMBINER
LOGIC
970

970A　　970B　　970C　　970D　　970E

| PRECEDENCE 00 | PRECEDENCE 01 | PRECEDENCE 10 | PRECEDENCE 11 | MERGED ACL RESULT |
|---|---|---|---|---|
| DENY | --- | --- | --- | DROP |
| REDIRECT | --- | --- | --- | REDIRECT |
| PERMIT | REDIRECT | --- | --- | REDIRECT |
| PERMIT | PERMIT | REDIRECT | --- | REDIRECT |
| PERMIT | PERMIT | PERMIT | REDIRECT | REDIRECT |
| PERMIT | PERMIT | PERMIT | PERMIT | PERMIT |
| PERMIT | DENY | --- | --- | DROP |
| PERMIT | PERMIT | DENY | --- | DROP |
| PERMIT | PERMIT | PERMIT | DENY | DROP |

FIGURE 9H

QOS
COMBINER
LOGIC
972

| SECURITY MERGED RESULT | PRECEDENCE 00 | PRECEDENCE 01 | PRECEDENCE 10 | PRECEDENCE 11 | MERGED QOS RESULT |
|---|---|---|---|---|---|
| PERMIT | PERMIT | --- | --- | --- | QOS ACTION 1 |
| PERMIT | DENY | PERMIT | --- | --- | QOS ACTION 2 |
| PERMIT | DENY | DENY | PERMIT | --- | QOS ACTION 3 |
| PERMIT | DENY | DENY | DENY | PERMIT | QOS ACTION 4 |
| PERMIT | DENY | DENY | DENY | DENY | DEFAULT QOS ACTION |
| DENY / REDIRECT | --- | --- | --- | --- | NO QOS ACTION |

GENERATING ACCOUNTING DATA BASED ON ACCESS CONTROL LIST ENTRIES

CROSS-REFERENCE TO RELATED APPLICATIONS

This is a continuation-in-part of application Ser. No. 10/215,719, filed Aug. 10, 2002, now U.S. Pat. No. 7,103,708 and is hereby incorporated by reference.

TECHNICAL FIELD

One embodiment of an invention especially relates to computer and communications systems, especially network routers and switches; and more particularly, one embodiment of an invention relates to generating accounting data based on access control list entries.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match.

Known approaches of packet classification include using custom application-specific integrated circuits (ASICs), custom circuitry, software or firmware controlled processors, and associative memories, including, but not limited to binary content-addressable memories (binary CAMs) and ternary content-addressable memories (ternary CAMs or TCAMs). Each entry of a binary CAM typically includes a value for matching against, while each TCAM entry typically includes a value and a mask. The associative memory compares a lookup word against all of the entries in parallel, and typically generates an indication of the highest priority entry that matches the lookup word. An entry matches the lookup word in a binary CAM if the lookup word and the entry value are identical, while an entry matches the lookup word in a TCAM if the lookup word and the entry value are identical in the bits that are not indicated by the mask as being irrelevant to the comparison operations.

Associative memories are very useful in performing packet classification operations. In performing a packet classification, it is not uncommon for multiple lookup operations to be performed in parallel or in series using multiple associative memories basically based on a same search key or variant thereof, as one lookup operation might be related to packet forwarding while another related to quality of service determination. Desired are new functionality, features, and mechanisms in associative memories to support packet classification and other applications.

Additionally, as with most any system, errors can occur. For example, array parity errors can occur in certain content-addressable memories as a result of failure-in-time errors which are typical of semiconductor devices. Additionally, communications and other errors can occur. Prior systems are known to detect certain errors and to signal that some error condition has occurred, but are typically lacking in providing enough information to identify and isolate the error. Desired is new functionality for performing error detection and identification.

One problem with performing packet classification is the rate at which it must be performed, especially when multiple features of a certain type are to be evaluated. A prior approach uses a series of lookups to evaluate an action to be taken for each of these features. This approach is too slow, so techniques, such as Binary Decision Diagram (BDD) and Order Dependent Merge (ODM), were used for combining these features so they can be evaluated in a single lookup operation. For example, if there are two ACLs A (having entries A1 and A2) and B (having entries B1 and B2), then ODM combines these original lists to produce one of two cross-product equivalent ordered lists, each with four entries: A1B1, A1B2, A2B1, and A2B2; or A1B1, A2B1, A1B2, and A2B2. These four entries can then be programmed into an associative memory and an indication of a corresponding action to be taken placed in an adjunct memory. Lookup operations can then be performed on the associative and adjunct memories to identify a corresponding action to use for a particular packet being processed. There are also variants of ODM and BDD which may filter out the entries which are unnecessary as their values will never allow them to be matched. However, one problem with these approaches is that there can be an explosion of entries generated by these algorithms. A typical worst case would be to multiply the number of items in each feature by each other. Thus, two features of one hundred items each can generate one thousand entries, and if a third feature is considered which also has one hundred items, one million entries could be generated. Desired is a new mechanism for efficiently performing lookup operations which may reduce the number of entries required.

A known approach of identifying traffic flows for the purpose of prioritizing packets uses CAMs to identify and "remember" traffic flows allowing a network switch or router to identify packets belonging to that flow, at wire speed, without processor intervention. In one approach, learning new flows is automatic. Once a flow is identified, the system software assigns the proper priority to the newly identified flow. In each of the cases where learning is necessary (i.e., adding a new connection), the next free address of the device is read out so the system software can keep track of where the new additions are being placed. This way, the system software can efficiently remove these entries when they are no longer active. If aging is not used, the system software would need to keep track of the locations of every entry, and when a session ends, remove the corresponding entries. This is not a real-time issue, so software can provide adequate performance.

Additionally, it is possible, even desirable to store timestamp information in the device to facilitate aging and purging of inactive flow identifiers.

For a purpose and context different from prioritizing packets, it is desirable to collect statistics about traffic flows (also referred to as "netflows"). These statistics can provide the metering base for real-time and post-processing applications including network traffic accounting, usage-based network billing, network planning, network monitoring, outbound marketing, and data mining capabilities for both service provider and enterprise customers. While this approach may work well for systems dealing with a relatively small amount of traffic with thousands of flows, this approach is not very scalable to systems handling larger amounts of data and flows as the collection of data on the raw flows generally produces too much unneeded data and requires a heavy burden on systems to collect all the information, if possible. Desired is a new mechanism for collecting accounting and other data.

SUMMARY

Methods, apparatus, and other mechanisms are disclosed for generating accounting or other data based on that indicated in an access control list or other specification, and typically using associative memory entries in one or more associative memory banks and/or memory devices. One embodiment identifies an access control list including multiple access control list entries, with a subset of these access control list entries identifying accounting requests. Accounting mechanisms, such as, but not limited to counters or data structures, are associated with each of said access control list entries in the subset of access control list entries identifying accounting requests. An item is identified. A particular one of the accounting mechanisms corresponding to the item is identified and updated. In one embodiment, the item corresponds to one or more fields of a received packet. In one embodiment, the item includes at least one autonomous system number, said at least one autonomous system number identify a set of communication devices under a single administrative authority. In one embodiment, at least one of the accounting mechanisms is associated with at least two different access control list entries in the subset of access control list entries identifying accounting requests.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 6A-B illustrate an exemplary policy map and resultant associative memory entries;

FIGS. 8A-G illustrate access control lists, processes, mechanisms, data structures, and/or other aspects of some of an unlimited number of systems employing embodiments for updating counters or other accounting devices, or for performing other functions; and FIGS. 9A-K illustrate access control lists, processes, mechanisms, data structures, and/or other aspects of some of an unlimited number of systems employing embodiments for generating merged results or for performing other functions.

DETAILED DESCRIPTION

Figure 1A:
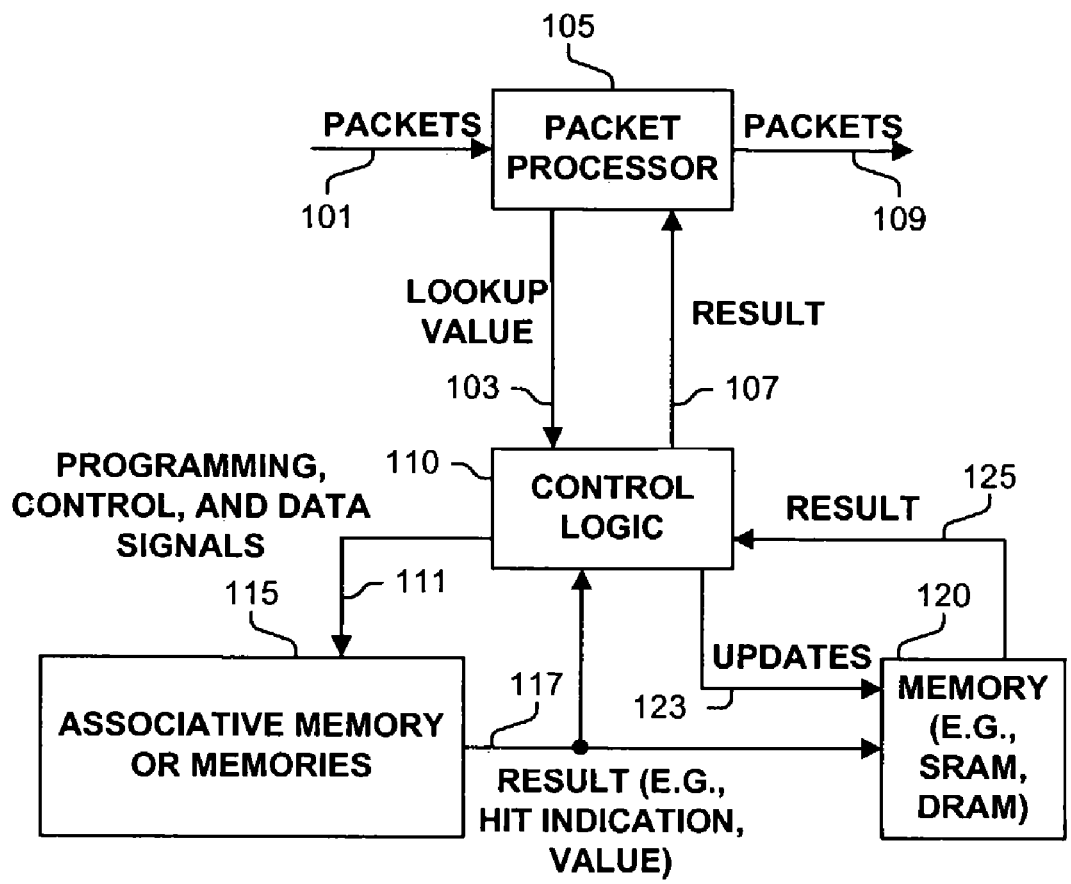
FIGS. 1A-E are block diagrams of various exemplary systems including one or more embodiments for performing lookup operations using associative memories.

Methods and apparatus are disclosed for generating accounting or other data based on that indicated in an access control list or other specification, for generating and merging lookup results to apply multiple features, for defining and using associative memory entries with force no-hit and priority indications of particular use in implementing policy maps in communication devices, and for performing lookup operations using associative memories, including, but not limited to modifying search keys within an associative memory based on modification mappings, forcing a no-hit condition in response to a highest-priority matching entry including a force no-hit indication, selecting among various associative memory blocks or sets or banks of associative memory entries in determining a lookup result, and detecting and propagating error conditions.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Methods and apparatus are disclosed for defining and using associative memory entries with force no-hit and priority indications of particular use in implementing policy maps in communication devices. In one embodiment, a set of entries is determined based on a policy map with a force no-hit indication being associated with one or more of the entries. Additionally, programmable priority indications may be associated with one or more of the entries, or with the associative memory devices, associative memory banks, etc. The force no-hit indications are often used in response to identified deny instructions in an access control list or other policy map. A lookup operation is then performed on these associative memory entries, with highest matching result or results identified based on the programmed and/or implicit priority level associated with the entries, or with the associative memory devices, associative memory banks, etc.

Methods and apparatus are disclosed for performing lookup operations using associative memories, including, but not limited to modifying search keys within an associative memory based on modification mappings, forcing a no-hit condition in response to a highest-priority matching entry including a force no-hit indication, selecting among various associative memory blocks or sets or banks of associative memory entries in determining a lookup result, and detecting and propagating error conditions. In one embodiment, each block retrieves a modification mapping from a local memory and modifies a received search key based on the mapping and received modification data. In one embodiment, each of the associative memory entries includes a field for indicating that a successful match on the entry should or should not force a no-hit result. In one embodiment, an indication of which associative memory sets or banks or entries to use in a particular lookup operation is retrieved from a memory.

One embodiment performs error detection and handling by identifying, handling and communication errors, which may include, but is not limited to array parity errors in associative memory entries and communications errors such as protocol errors and interface errors on input ports. Array parity errors can occur as a result of failure-in-time errors which are typical of semiconductor devices. One embodiment includes a mechanism to scan associative memory entries in background, and to identify any detected errors back to a control processor for re-writing or updating the flawed entry. In one embodiment, certain identified errors or received error conditions are of a fatal nature in which no processing should be performed. For example, in one embodiment, a fatal error causes an abort condition. In response, the device stops an in-progress lookup operation and just forwards error and possibly no-hit signals. Typically, these signals are generated at the time the in-progress lookup operation would have generated its result had it not been aborted so as to maintain timing among devices in a system including the associative memory.

In one embodiment, including cascaded or connected associative memory devices, error status messages indicating any error type and its corresponding source are propagated to indicate the error status to the next device and/or a control processor. In addition, the communicated signal may indicate and generate an abort condition in the receiving device. In one embodiment, the receiving device does not perform its next operation or the received instruction, or it may abort its current operation or instruction. Moreover, the receiving device may or may not delay a time amount corresponding to that which its processing would have required in performing or completing the operation or instruction so as to possibly maintain the timing of a transactional sequence of operations.

One embodiment generates accounting or other data based on that indicated in an access control list or other specification, and typically using associative memory entries in one or more associative memory banks and/or memory devices. One embodiment identifies an access control list including multiple access control list entries, with a subset of these access control list entries identifying accounting requests. Accounting mechanisms, such as, but not limited to counters or data structures, are associated with each of said access control list entries in the subset of access control list entries identifying accounting requests. An item is identified. A particular one of the accounting mechanisms corresponding to the item is identified and updated. In one embodiment, the item corresponds to one or more fields of a received packet. In one embodiment, the item includes at least one autonomous system number, said at least one autonomous system number identify a set of communication devices under a single administrative authority. In one embodiment, at least one of the accounting mechanisms is associated with at least two different access control list entries in the subset of access control list entries identifying accounting requests.

One embodiment merges lookup results, such as from one or more associative memory banks and/or memory devices. One embodiment identifies an access control list including multiple access control list entries. A first set of access control list entries corresponding to a first feature of the access control list entries and a second set of access control list entries corresponding to a second feature of the access control list entries are identified. A first associative memory bank is programmed with the first associative memory entries and a second associative memory bank is programmed with the second associative memory entries, with the first associative memory entries having a higher lookup precedence than the second associative memory entries. A lookup value is then identified, such as that based on a packet or other item. Lookup operations are then typically performed substantially simultaneously on the first and second sets of associative memory entries to generate multiple lookup results, with these results typically being identified directly, or via a lookup operation in an adjunct memory or other storage mechanism. These lookup results are then combined to generate a merged lookup result.

FIGS. 1A-E are block diagrams of various exemplary systems and configurations thereof, with these exemplary systems including one or more embodiments for performing lookup operations using associative memories. First, FIG. 1 illustrates one embodiment of a system, which may be part of a router or other communications or computer system, for performing lookup operations to produce results which can be used in the processing of packets. In one embodiment, control logic 110, via signals 111, programs and updates associative memory or memories 115, such as, but not limited to one or more associative memory devices, banks, and/or sets of associative memory entries which may or may not be part of the same associative memory device and/or bank. In one embodiment, control logic 110 also programs memory 120 via signals 123. In one embodiment, control logic 110 includes custom circuitry, such as, but not limited to discrete circuitry, ASICs, memory devices, processors, etc.

In one embodiment, packets 101 are received by packet processor 105. In addition to other operations (e.g., packet routing, security, etc.), packet processor 105 typically generates one or more items, including, but not limited to one or more packet flow identifiers based on one or more fields of one or more of the received packets 101 and possibly from information stored in data structures or acquired from other sources. Packet processor 105 typically generates a lookup value 103 which is provided to control logic 110 for providing control and data information (e.g., lookup words, modification data, profile IDs, etc.) to associative memory or memories 115, which perform lookup operations and generate one or more results 117. In one embodiment, a result 117 is used is by memory 120 to produce a result 125. Control logic 110 then relays result 107, based on result 117 and/or result 125, to packet processor 105. In response, one or more of the received packets are manipulated and forwarded by packet processor 105 as indicated by packets 109. Note, results 117, 125 and 107 may include indications of error conditions.

Figure 1B:
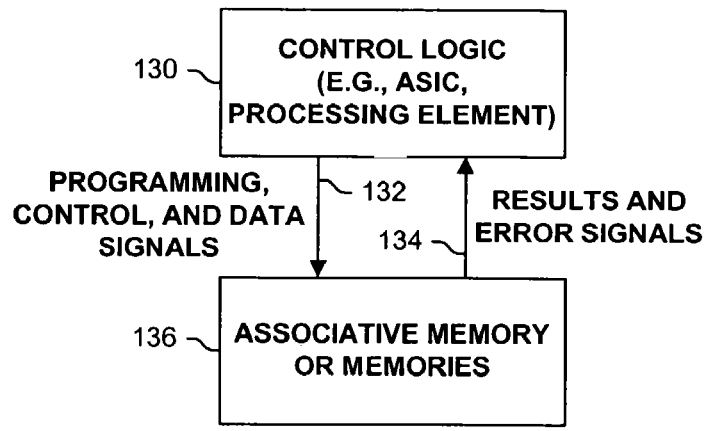

FIG. 1B illustrates one embodiment for performing lookup operations using associative memories, including, but not limited to modifying search keys within an associative memory based on modification mappings, forcing a no-hit condition in response to a highest-priority matching entry including a force no-hit indication, selecting among various associative memory blocks or sets or banks of associative memory entries in determining a lookup result, and detecting and propagating error conditions. Control logic 130, via signals 132, programs associative memory or memories 136. In addition, control logic 130 provides control and data information (e.g., lookup words, modification data, profile IDs, etc.) to associative memory or memories 136, which perform lookup operations to generate results and error signals 134, which are received by control logic 130.

Figure 1C:
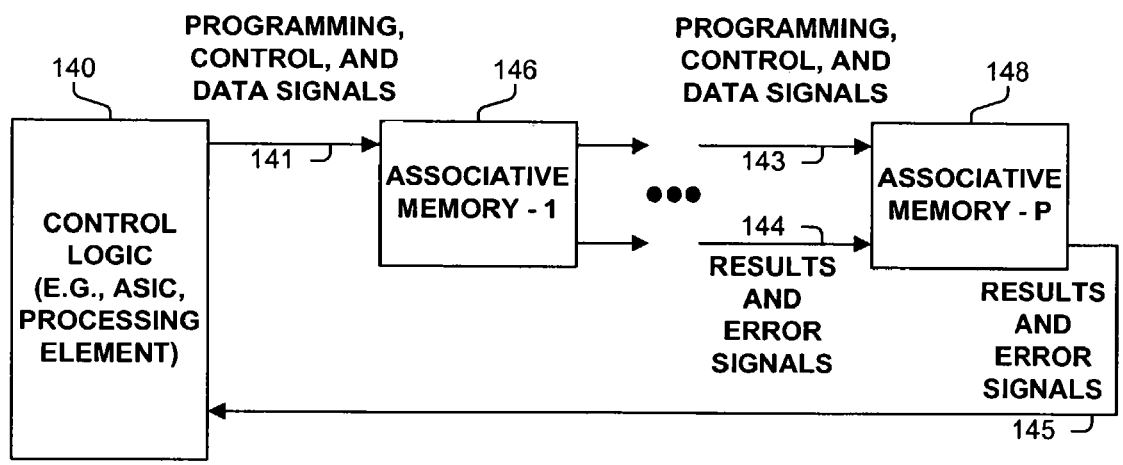

FIG. 1C illustrates one embodiment for performing lookup operations using associative memories, including, but not limited to modifying search keys within an associative memory based on modification mappings, forcing a no-hit condition in response to a highest-priority matching entry including a force no-hit indication, selecting among various associative memory blocks or sets or banks of associative memory entries in determining a lookup result, and detecting and propagating error conditions. Control logic 140, via signals 141-143, programs associative memories 146-148. In addition, control logic 140 provides control and data information (e.g., lookup words, modification data, profile IDs, etc.) to associative memories 146-148, which perform lookup operations to generate results and error signals 144-145. As shown each progressive stage forwards error messages to a next associative memory stage or to control logic 140. For example, associative memory 148 relays received error indications via signals 144 via signals 145 to control logic 140.

Moreover, in one embodiment, a synchronization bit field is included in messages 141-145 sent between devices 140 and 146-148, with the value being set or changed at predetermined periodic intervals such that each device 140, 146-148 expects the change. One embodiment uses a single synchronization bit, and if this bit is set in the request or input data 141-145 to a device 146-148, then the device 146-148 will set this bit in the corresponding reply or output data 143-145. For example, in one embodiment, control processor or logic 140 sets the sync bit in its request data 141 periodically, say once in every eight requests. Control processor or logic 140 also monitors the sync bit in the reply data 145. If any kind of error altered the request-reply association (or transaction timing) between the control processor or logic 140 and the associative memories 146-148, then control processor or logic 140 can detect it and recover from that error (by flushing the pipeline, etc.)

In this manner, devices, especially those as part of a transactional sequence, can synchronize themselves with each other. Resynchronization of devices may become important, for example, should an error condition occur, such as an undetected parity error in a communicated instruction signal (e.g., the number of parity errors exceed the error detection mechanism). There is a possibility that a parity error in an instruction goes undetected and that completely changes the transaction timing. Also, there could be other types of "unknown" errors that can put the control processor or logic and the associative memory chain out of synchronization.

Figure 1D:
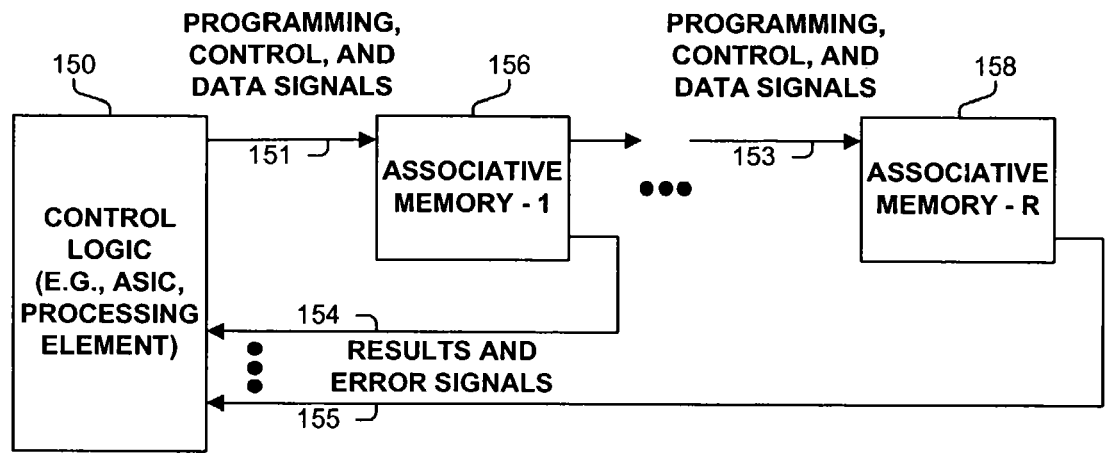

FIG. 1D illustrates one embodiment for performing lookup operations using associative memories, including, but not limited to modifying search keys within an associative memory based on modification mappings, forcing a no-hit condition in response to a highest-priority matching entry including a force no-hit indication, selecting among various associative memory blocks or sets or banks of associative memory entries in determining a lookup result, and detecting and propagating error conditions. Control logic 150, via signals 151-153, programs associative memories 156-158. In addition, control logic 150 provides control and data information (e.g., lookup words, modification data, profile IDs, etc.) to associative memories 156-158, which perform lookup operations to generate results and error signals 154-155 which are communicated to control logic 150.

Figure 1E:
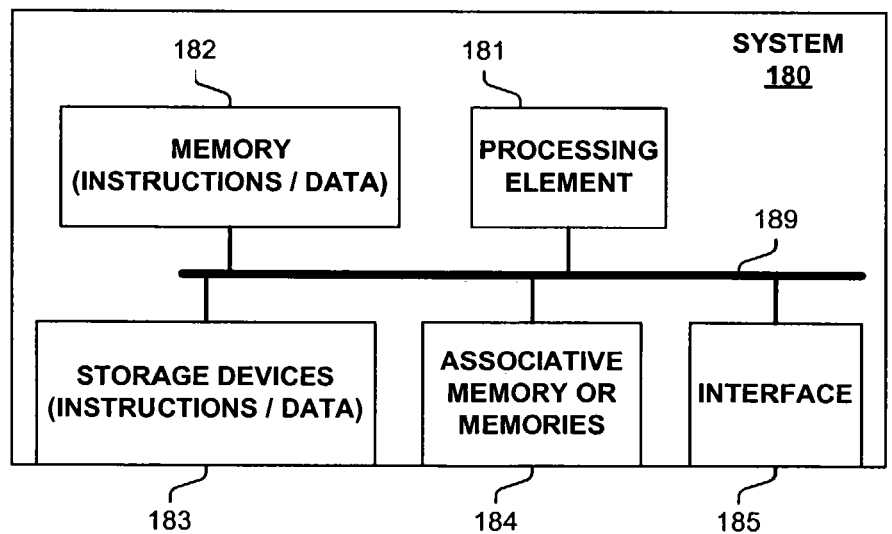

FIG. 1E illustrates a system 180, which may be part of a router or other communications or computer system, used in one embodiment for distributing entries among associative memory units and selectively enabling less than all of the associative memory units when performing a lookup operation. In one embodiment, system 180 includes a processing element 181, memory 182, storage devices 183, one or more associative memories 184, and an interface 185 for connecting to other devices, which are coupled via one or more communications mechanisms 189 (shown as a bus for illustrative purposes).

Various embodiments of system 180 may include more or less elements. The operation of system 180 is typically controlled by processing element 181 using memory 182 and storage devices 183 to perform one or more tasks or processes, such as programming and performing lookup operations using associative memory or memories 184. Memory 182 is one type of computer-readable medium, and typically comprises random access memory (RAM), read only memory (ROM), flash memory, integrated circuits, and/or other memory components. Memory 182 typically stores computer-executable instructions to be executed by processing element 181 and/or data which is manipulated by processing element 181 for implementing functionality in accordance with one embodiment of the invention. Storage devices 183 are another type of computer-readable medium, and typically comprise solid state storage media, disk drives, diskettes, networked services, tape drives, and other storage devices. Storage devices 183 typically store computer-executable instructions to be executed by processing element 181 and/or data which is manipulated by processing element 181 for implementing functionality in accordance with one embodiment of the invention.

In one embodiment, processing element 181 provides control and data information (e.g., lookup words, modification data, profile IDs, etc.) to associative memory or memories 184, which perform lookup operations to generate lookup results and possibly error indications, which are received and used by processing element 181 and/or communicated to other devices via interface 185.

Figure 2:
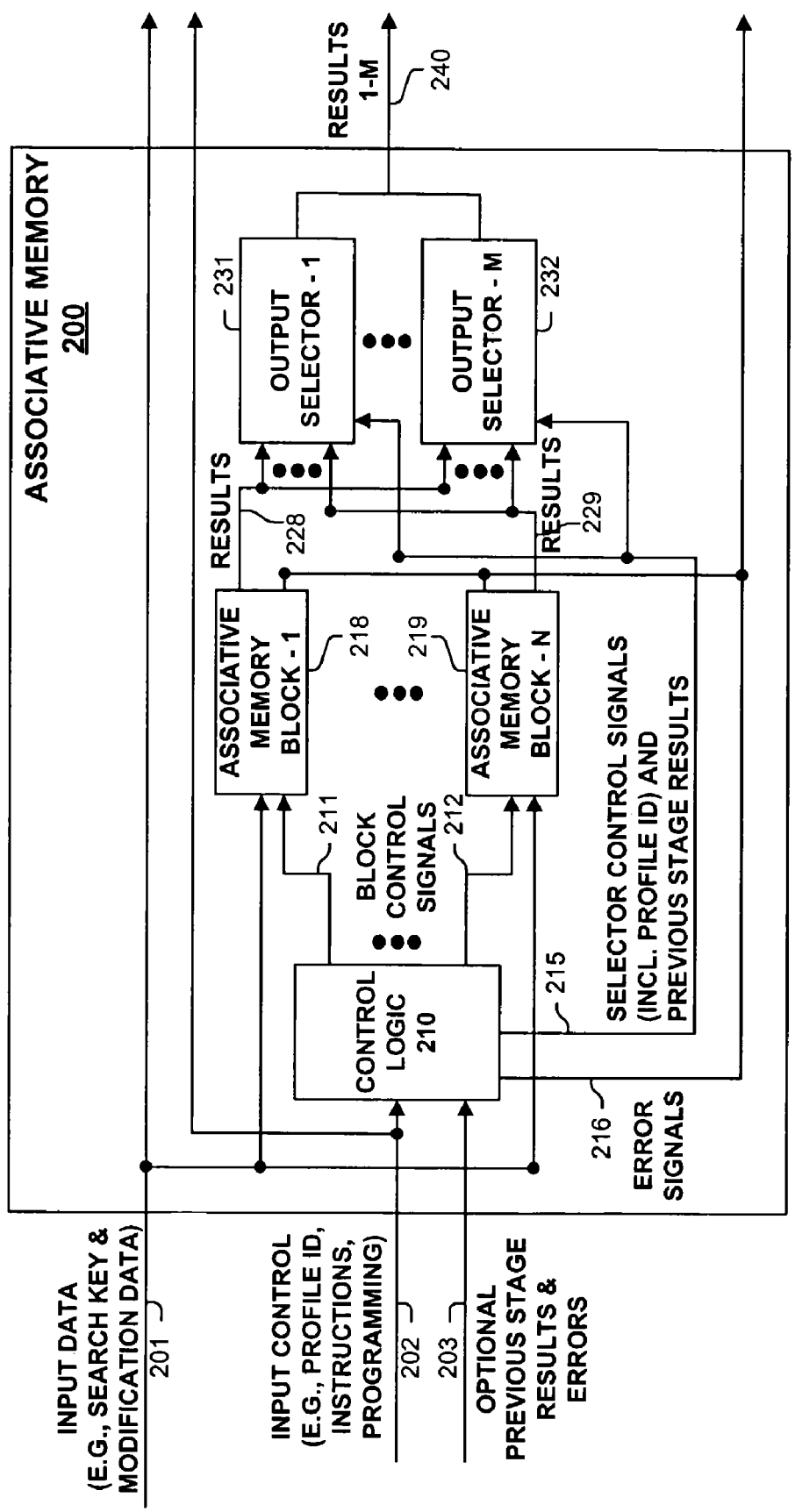
FIG. 2 is a block diagram of an associative memory including one or more embodiments for performing lookup operations.

FIG. 2 illustrates an associative memory 200 used in one embodiment for performing lookup operations using associative memories, including, but not limited to modifying search keys within an associative memory based on modification mappings, forcing a no-hit condition in response to a highest-priority matching entry including a force no-hit indication, selecting among various associative memory blocks or sets or banks of associative memory entries in determining a lookup result, and detecting and propagating error conditions. As shown, control logic 210 receives input control signals 202 which may include programming information. In turn, control logic 210 may update information and data structures within itself, program/update associative memory blocks 218-219, and/or output selectors 231-232. Note, in one embodiment, each of the associative memory blocks 218-219 include one or more associative memory sets or banks of associative memories entries, and logic or circuitry for performing lookup operations.

In one embodiment, input data 201, which may include, but is not limited to search keys and modification data, is received by associative memory 200 and distributed to associative memory blocks 218-219, and possibly forwarded to other downstream associative memories in a cascaded configuration. In addition, input control information 202, which may include, but is not limited to profile IDs (e.g., a value), instructions, programming information, is received by control logic 210, and possibly forwarded to other downstream associative memories in a cascaded configuration. In addition, in one embodiment, previous stage lookup results and/or error indications are received from previous stage associative memories in a cascaded configuration or from other devices by control logic 210. Note, in one embodiment, input data 201, input control 202, previous stage results and errors 203, and/or portions thereof are communicated directly to associative memory blocks 218-219 and/or output selectors 231-232.

Control logic 210 possibly processes and/or forwards the received information via block control signals 211-212 to associative memory blocks 218-219 and via selector control signals and previous stage results 215 (which typically includes the received profile ID) to output selectors 231-232. In addition, control logic 210 may generate error signals 216 based on a detected error in the received information or in response to received error condition indications. Note, in one embodiment, control logic 210 merely splits or regenerates a portion of or the entire received input control 202 and optional previous stage results and errors 203 signals as selector control signals and previous stage results signals 215 and/or error signals 216. In addition, control logic 210 could initiate an abort operation wherein a lookup operation will not occur because of a detected or received notification of an error condition.

In one embodiment, control logic 210 identifies data representing which associative memory blocks 218-219 to enable, which associative memory blocks 218-219 each output selector 231-232 should consider in determining its lookup result, and/or modification mappings each associative memory block 218-219 should use in modifying an input search key. In one embodiment, this data is retrieved, based on received input control information 202 (e.g., a profile ID or other indication), from one or more memories, data structures, and/or other storage mechanisms. This information is then communicated as appropriate to associative memory blocks 218-219 via block control signals 211-212, and/or output selectors 231-232 via selector control signals and previous stage results signals 215.

In one embodiment, associative memory blocks 218-219 each receive a search key and possibly modification data via signal 201, and possibly control information via block control signals 211-212. Each enabled associative memory block 218-219 then performs a lookup operation based on the received search key, which may include generating a lookup word by modifying certain portions of the search key based on received modification data and/or modification mappings. Each associative memory block 218-219 typically generates a result 228-229 which are each communicated to each of the output selectors 231-232. In one embodiment, each associative memory block 218-219 that is not enabled generates a no-hit signal as its corresponding result 228-229. In one embodiment, output selectors 231-232 receive an indication of the associative memory blocks 218-219 that is not enabled.

Output selectors 231 evaluate associative memory results 228-229 to produce results 240. In one embodiment, each output selector has a corresponding identified static or dynamic subset of the associate memory results 228-229 to evaluate in determining results 240. In one embodiment, an identification of this corresponding subset is provided to each output selector 231-232 via selector control signals 215. In one embodiment, each of the output selectors 231-232 receives a profile ID via selector control signals 215 and performs a memory lookup operation based on the received profile ID to retrieve an indication of the particular associate memory results 228-229 to evaluate in determining results 240.

Moreover, in one embodiment, results 240 are exported over one or more output buses 240, each typically connected to a different set of one or more pins of a chip of the associative memory. In one embodiment, the number of output buses used and their connectivity to outputs selectors 231-232 are static, while in one embodiment the number of output buses used and their connectivity to outputs selectors 231-232 are configurable, for example, at initialization or on a per or multiple lookup basis. In one embodiment, an output bus indication is received by an output selector 231-232, which uses the output bus indication to determine which output bus or buses to use. For example, this determination could include, but is not limited to a direct interpretation of the received output bus indication, performing a memory read operation based on the received output bus indication, etc. In one embodiment, an output selector 231-232 performs a memory access operation based on a profile ID to determine which output bus or buses to use for a particular lookup operation. Thus, depending on the configuration, a single or multiple output buses/pins can selectively be used to communicate results 240, with this decision possibly being made based on the tradeoff of receiving multiple results simultaneously versus the number of pins required.

Associative memory 200 provides many powerful capabilities for simultaneously producing one or more results 240. For example, in one embodiment, based on a received profile ID, control logic 210 identifies which of the one or more associative memory blocks 218-219 to enable and then enables them, and provides the profile ID to output selectors 231 for selecting a lookup result among the multiple associative memory blocks 218-219. Each of the associative memory blocks 218-219 may receive/identify a modification mapping based on the profile ID, with this modification mapping possibly being unique to itself. This modification mapping can then be used in connection with received modification data to change a portion of a received search key to produce the actual lookup word to be used in the lookup operation. Also, certain entries may be programmed with force no-hit indications to generate a no-hit result for the corresponding associative memory block 218-219 should a corresponding entry be identified as the highest priority entry matching the lookup word. Each of these enabled associative memory block 218-219 typically generate a result (e.g., no-hit, hit with highest priority matching entry or location thereof identified) which is typically communicated to each of the output selectors 231-232. Note, in one embodiment, the results are only communicated to the particular output selectors 231-232 which are to consider the particular result in selecting their respective highest priority result received from associative memory blocks 218-219 and possibly other lookup results from previous stage associative memories. Additionally, in certain configurations, multiple associative memories 200 are cascaded or coupled in other methods so that results from one or more stages may depend on previous stage results, such that a lookup can be programmed to be performed across multiple associative memories 200. These and other constructs provided by associative memory 200 and configurations thereof provide powerful programmable lookup search capabilities and result selection mechanisms using one or more stages of associative memories 200, each including N associative memories blocks 218-219 and M output selectors 231-232. In one embodiment, the actual values of N and M may vary among associative memories 200.

Figure 3A:
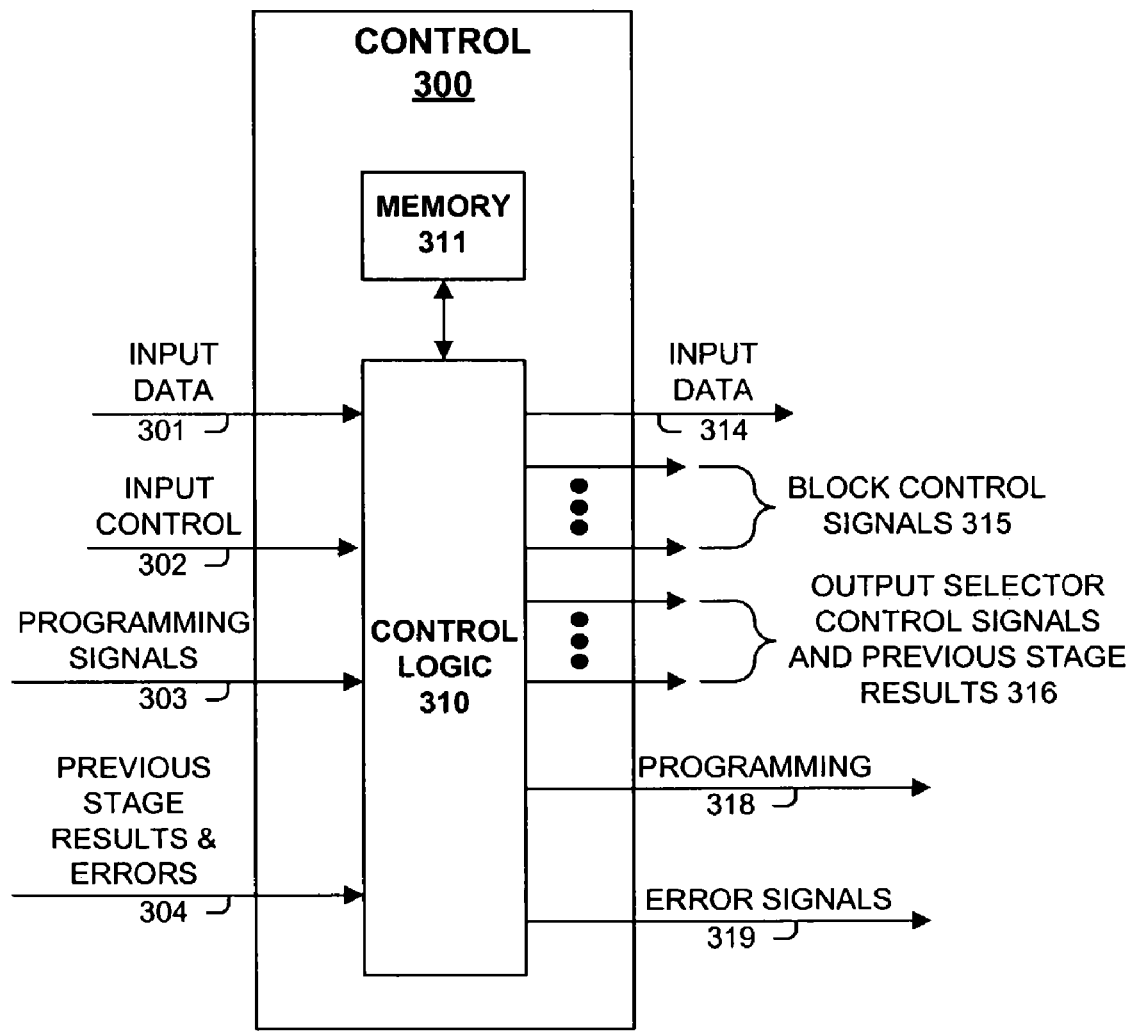
FIGS. 3A-D illustrate various aspects of a control used in one embodiment for performing lookup operations.

FIG. 3A illustrates a control 300 (which may or may not correspond to control logic 210 of FIG. 2) of an associative memory used in one embodiment. As shown, control 300 includes control logic 310 and memory 311. In one embodiment, programming signals 303 are received, and in response, one or more data structures in memory 311 are updated. In addition, control logic generates programming signals 318. In one embodiment, programming 318 is the same as programming signals 303 and thus a physical connection can be used rather than passing through control logic 310. One embodiment of a programming process is illustrated in FIG. 3C, in which processing begins with process block 380. Processing then proceeds to process block 382, wherein programming signals are received. Next, in process block 384, data structures and other elements (e.g., associative memory blocks, output selectors, etc.) are updated. Processing is completed as indicated by process block 386.

Returning to FIG. 3A, in performing a lookup operation, input data 301, input control 302, and optionally previous stage results and errors 304 (such as in a cascaded associative memory configuration) are received by control logic 310. In response, one or more data structures in memory 311 are referenced. Control logic 310 generates input data 314, block control signals 315, output selector control signals and (optionally) previous stage results 316, and possibly an error signal 319 indicating a detected error condition or a received error indicator. In one embodiment, input data 314 is the same as input data 301 and thus a physical connection can be used rather than passing through control logic 310.

Figure 3B:
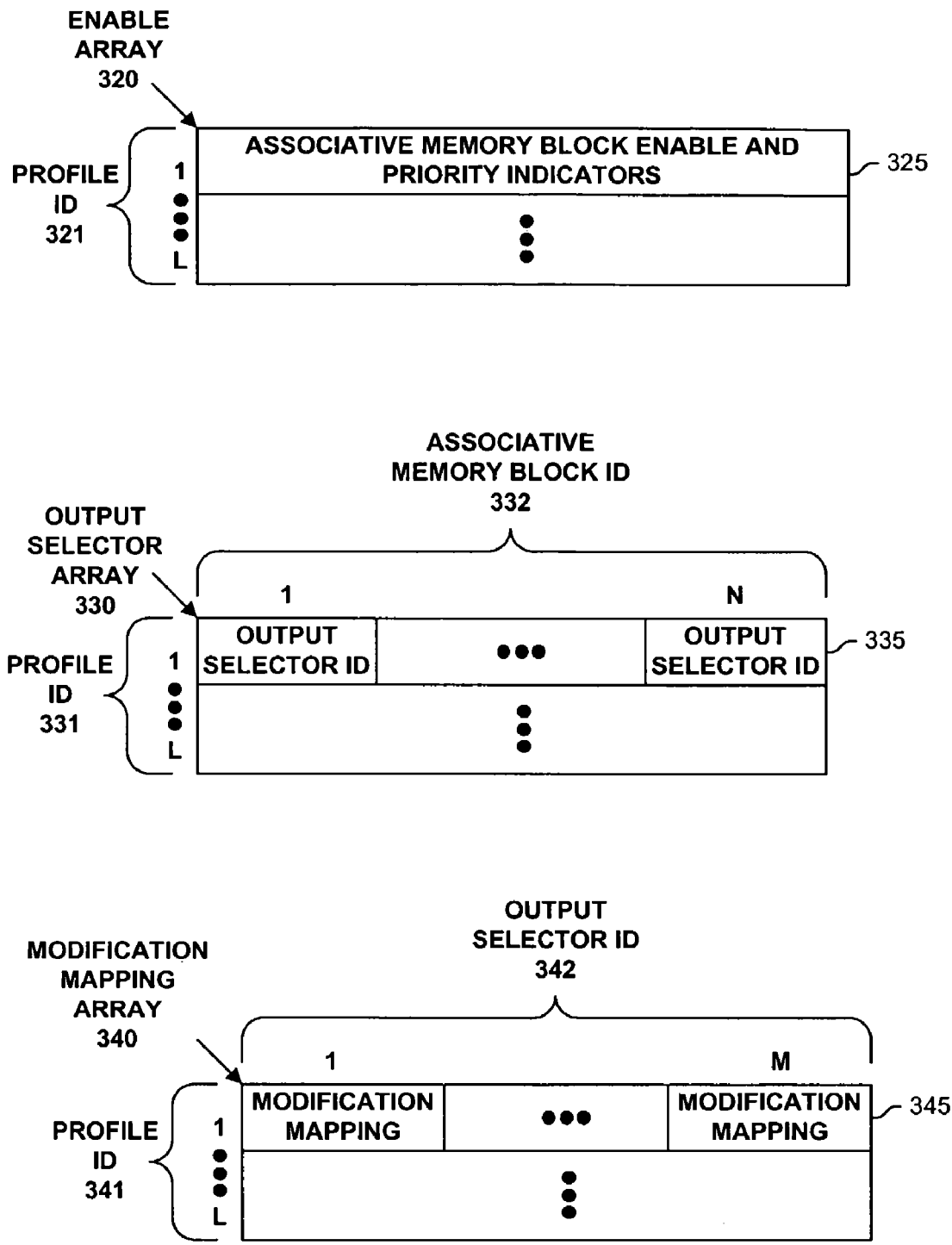
Figure 3C:
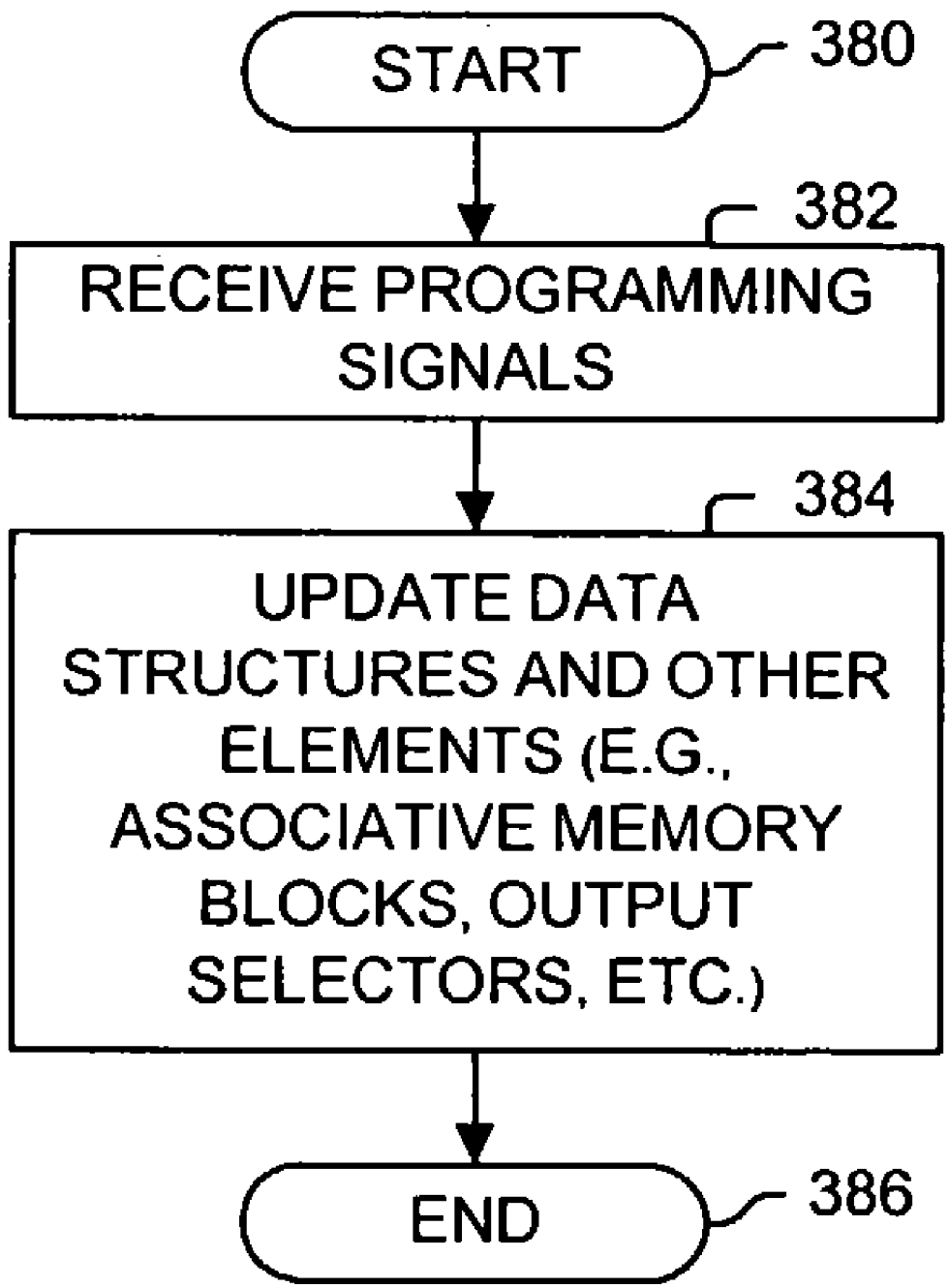

FIG. 3B illustrates one set of data structures used in one embodiment. Enable array 320 is programmed with an associative memory block enable indicator 325 for each profile ID 321 to be used. Each associative memory block enable indicator 325 identifies which associative memory blocks are to be enabled for a given lookup operation. In one embodiment, associative memory block enable indicator 325 includes a programmable priority level indication for use in identifying which result should be used from results from multiple blocks and/or previous stages. Thus, based on a profile ID 321 received via input control 302 (FIG. 3A), enable array 320 can be retrieved from memory 311 (FIG. 3A), which can then be used to generate associative memory block enable signals (and priority indications) included in block control signals 315 (FIG. 3A). In one embodiment, associative memory block enable indicator 325 is a bitmap data structure, while in one embodiment, associative memory block enable indicator 325 is a list, set, array, or any other data structure.

Output selector array 330 is programmed with an output selector ID 335 identifying which output selector, such as, but not limited to output selectors 231-232 (FIG. 2) for each tuple (profile ID 331, associative memory block ID 332). Thus, based on a profile ID 331 received over via input control 302 (FIG. 3A), an output selector ID 335 can be identified for each associative memory block ID 332. In one embodiment, output selector ID 335 is a numeric identifier, while in one embodiment, output selector ID 335 is any value or data structure.

Modification mapping array 340 is programmed with a modification mapping 345 for each tuple (profile ID 341, output selector ID 342). Thus, based on a profile ID 341 received over via input control 302 (FIG. 3A), a modification mapping 345 can be identified for each output selector ID 342. In one embodiment, each modification mapping is a data structure identifying how to modify a received search key with received modification data.

Figure 3D:
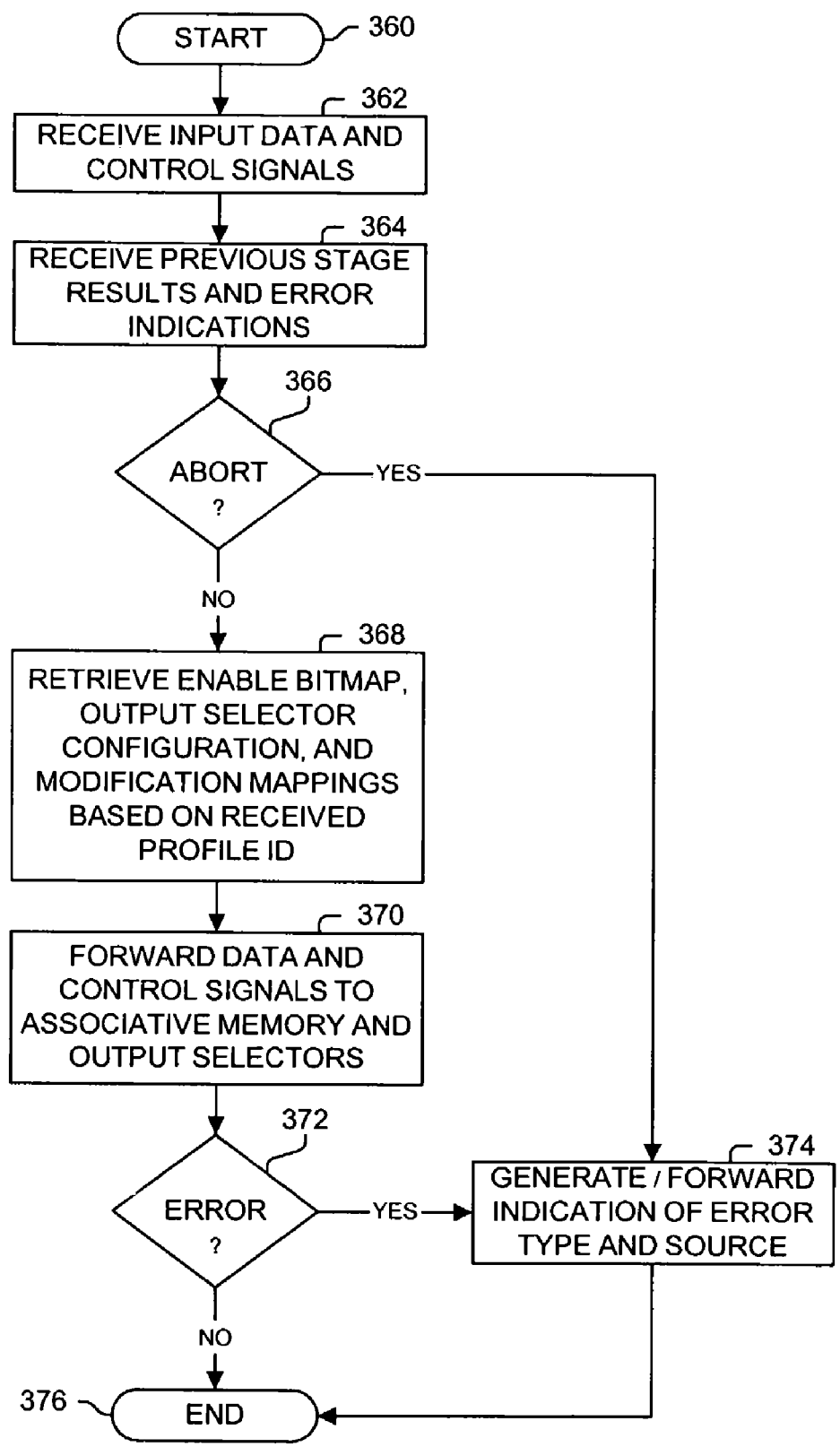

FIG. 3D illustrates a process used in one embodiment for initiating a lookup operation. Processing begins with process block 360, and proceeds to process block 362, wherein input data and control signals are received. Next, in process block 364, any previous stage results and error indications are received. As determined in process block 366, if an abort operation should be performed, such as, but not limited to in response to a received fatal error indication or an identified fatal error condition, then processing proceeds to process block 374 (discussed hereinafter). Otherwise, in process block 368, the enable bitmap, output selector configuration, and modification mappings are received based on the profile ID. Next, in process block 370, data and control signals based on the retrieved and received information are forwarded to the associative memory blocks and output selectors. As determined in process block 372, if an error condition is identified or has been received, then in process block 374, an error indication, typically including an indication of the error type and its source is generated or forwarded. Processing is complete as indicated by process block 376.

Figure 4A:
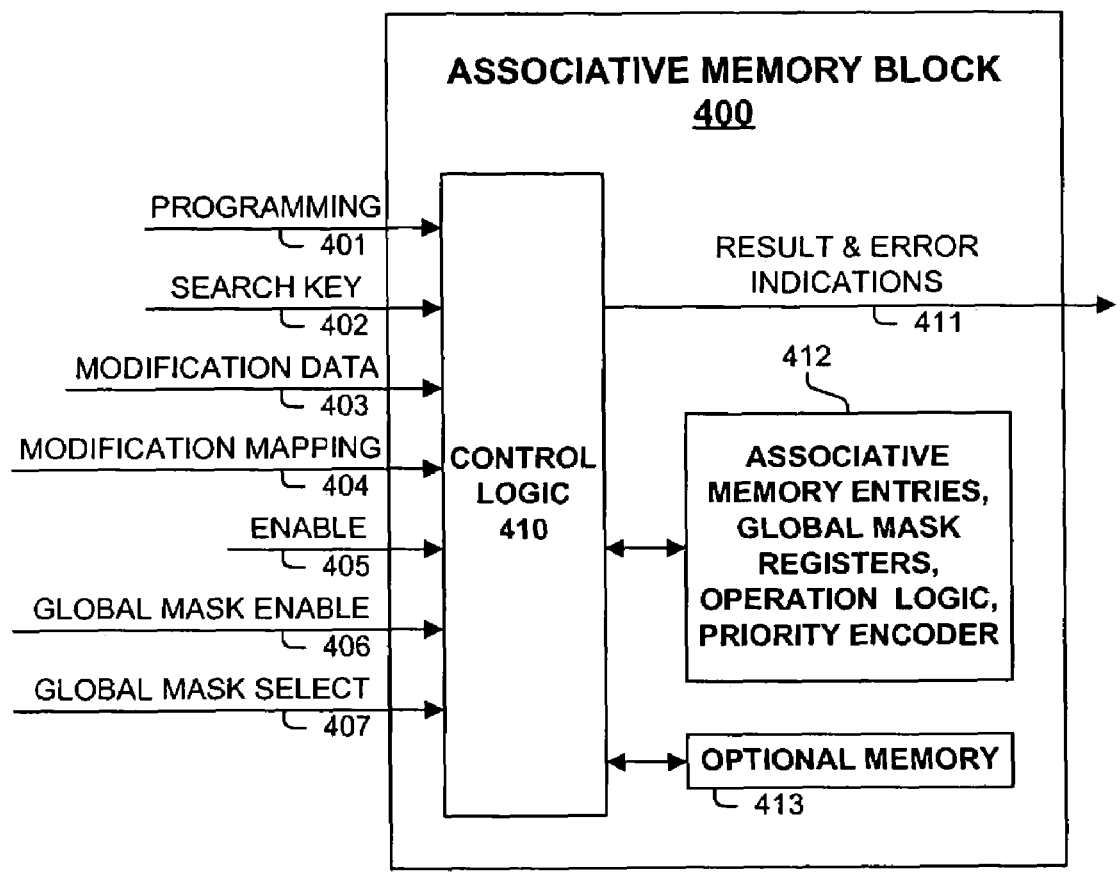
FIGS. 4A-G illustrate various aspects of an associative memory block used in one embodiment for performing lookup operations.

FIG. 4A illustrates an associative memory block 400 used in one embodiment. Associative memory block 400 typically includes control logic 410 and associative memory entries, global mask registers, operation logic and priority encoder 412 (e.g., elements for performing the associative memory match operation on a received lookup word). In one embodiment, sets of associative memory entries are grouped into banks of associative memory entries. In one embodiment, programming signals 401 are received, and in response, one or more associative memory entries and/or global mask registers in block 412 are updated. In one embodiment, an associative memory block 400 corresponds to a set or bank of associative memory entries and a mechanism for performing a lookup operation on the set or bank of associative memory entries to produce one or more results. In one embodiment, no mask register is included in associative memory block 400.

Moreover, one embodiment of associative memory block 400 includes a memory 413 for storing configuration information, which may allow an associative memory block 400 to retrieve the information from memory 413 rather than receive it from another source. For example, in one embodiment, modification mapping data (e.g., modification mapping 345 of FIG. 3B) or other information is programmed into memory 413. Then, associative memory block 400 retrieves the modification mapping information, such as based on a received profile ID (e.g., rather than receiving the modification mapping signal 404).

Additionally, in one embodiment, a search key 402, modification data 403, modification mapping 404, an enable signal 405, a global mask enable signal 406, and a global mask select signal 407 are received. In response to performing a lookup operation and/or detecting an error condition, such as a parity fault in one of the associative memory entries, result and error indications 411 are generated. In one embodiment, associative memory entries are checked for parity errors in background. The use of these signals and information in one embodiment are further described in relation to FIGS. 4B-4G.

Figure 4B:
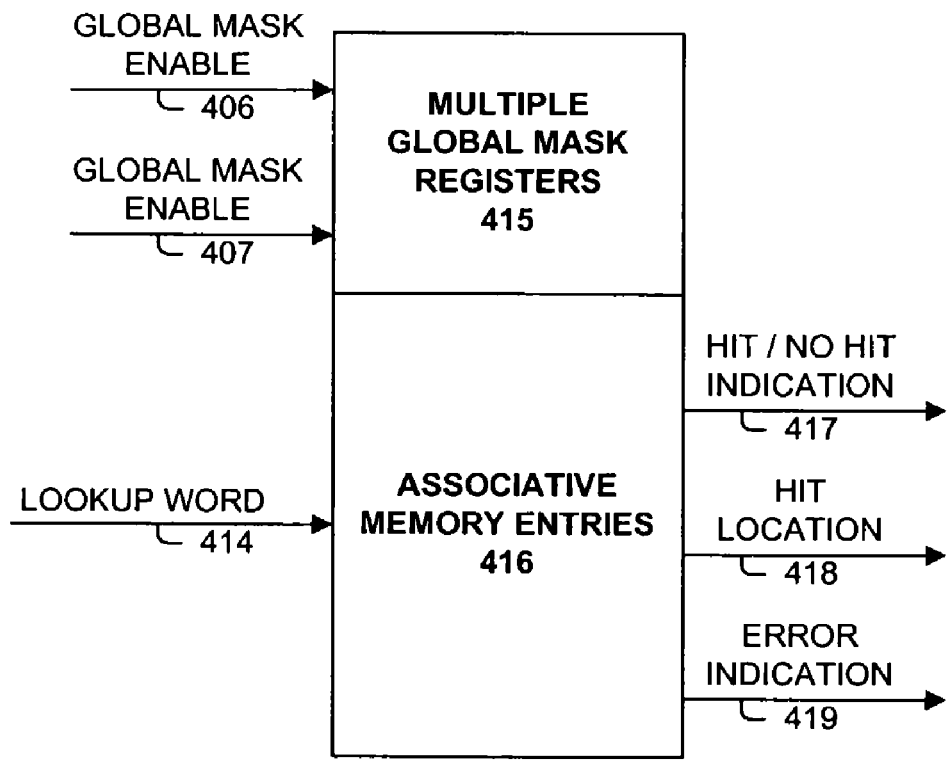

Turning to FIG. 4B, one embodiment includes multiple global mask registers 415 for use in a lookup operation on associative memory entries 416. Global mask enable signal 406 enables the use of a global mask register, while global mask select 407 identifies which of multiple masks to apply to each of the associative memory entries. Lookup word 414 is applied to associative memory entries 416, with possibly using one or more of global masks stored in global mask registers 415, to generate hit/no hit indication 417 and possibly hit location 418 and/or error indication 419, which are incorporated directly or indirectly into result and error indications 411 (FIG. 4A).

Figure 4C:
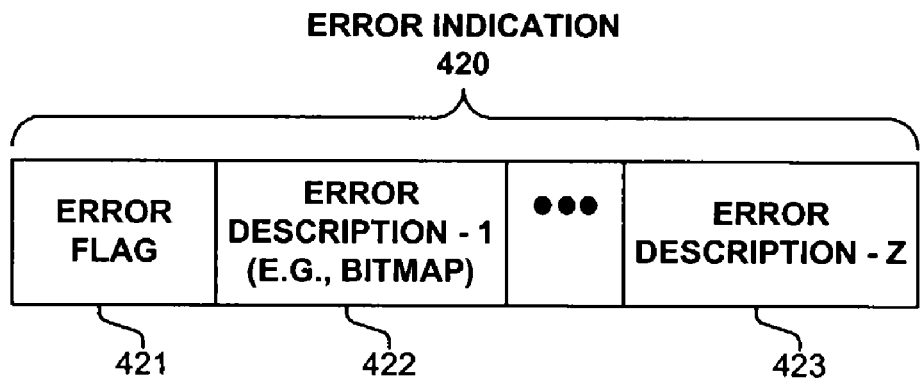

FIG. 4C illustrates an error indication 420 used in one embodiment. As shown, error indication 420 includes an error indication 421 for identifying if any or possibly the number of error indications included therein. For any identified error condition or received error indication, an encoded description of each error is included in one or more of the error descriptors 422-423. In one embodiment, a bitmap is used in one or more of error descriptors 422-423, wherein each bit represents a possible error condition, and the value of the bit indicates whether or not a corresponding error has been identified (including received from a prior component or stage.) In one embodiment, each error descriptor 422-423 corresponds to a different component, interface, or previous stage. In one embodiment, error indication 420 is used by other components in communicating error conditions or lack thereof.

Figure 4D:
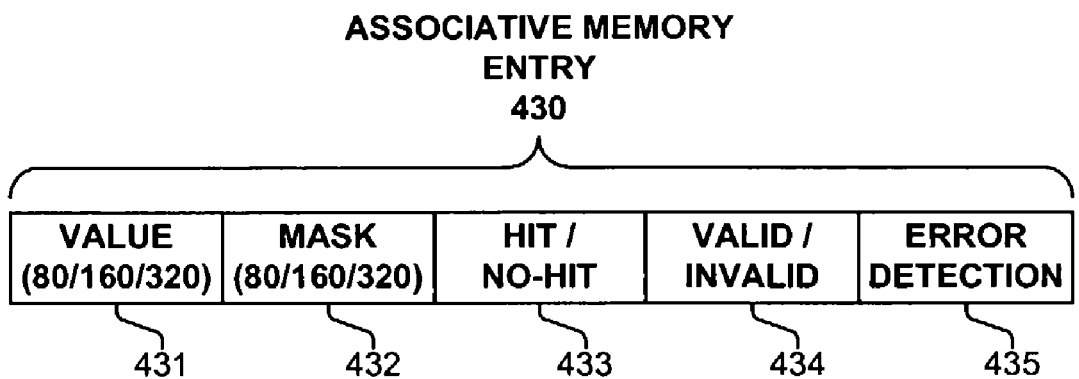

FIG. 4D illustrates an associative memory entry 430 used in one embodiment. As shown, associative memory entry 430 includes a value 431, an optional mask 432, force no hit indication 433, valid/invalid flag 434, and an error detection value 435. Error detection value 435 may be one or more parity bits, a cyclic redundancy checksum value, or a value corresponding to any other mechanism used for detecting data corruption errors. In one embodiment, value 431 is of a configurable width. In one embodiment, this configurable width includes 80 bits, 160 bits and 320 bits. In one embodiment, such as that of a binary content-addressable memory, no mask field 432 is included. In one embodiment, the width of mask field 432 is variable, and typically, although not required, matches the width of value field 431. In one embodiment, fields 431-435 are stored in a single physical memory; while in one embodiment, fields 431-435 are stored in multiple physical memories.

Figure 4E:
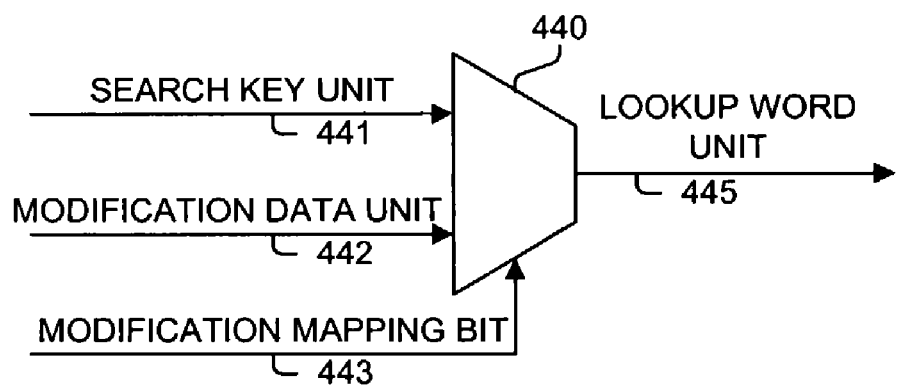

FIG. 4E illustrates a mechanism to modify a search key based on modification mapping and modification information used in one embodiment. As shown, a modification mapping bit 443 is used to control selector 440 which selects either search key unit (e.g., one or more bits, bytes, etc.) 441 or modification data unit 442 as the value for lookup unit 445, which is typically a portion of the actual lookup word to be used in matching associative memory entries in a lookup operation.

Figure 4F:
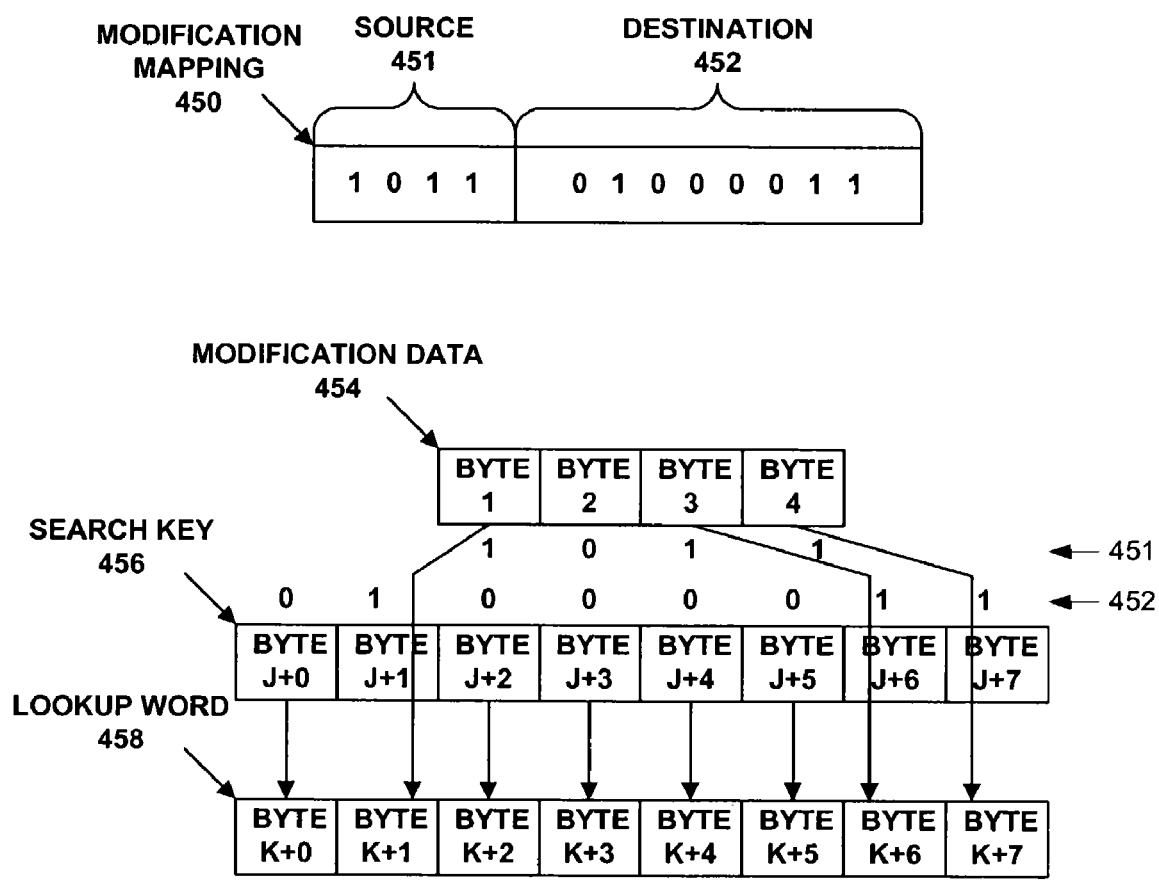

FIG. 4F illustrates a mechanism to modify a search key 456 based on modification mapping 450 and modification data 454 used in one embodiment. In one embodiment, modification mapping 450 corresponds to a modification mapping 345 (FIG. 3B). As shown in FIG. 4F, modification mapping 450 includes a source portion 451 and a destination portion 452. Referring to the lower portion of FIG. 4F, modification data 454 includes four bytes and search key 456 includes eight bytes. The source portion 451 of modification mapping 450 identifies which bytes of modification data 454 are to be used in generating lookup word 458, and the destination portion 452 of modification mapping 450 identifies where the corresponding bytes to be used of modification data 454 are to be placed in lookup word 458, with the remaining bytes coming from search key 456. In other words, modification mapping 450 and modification data 454 are used to replace certain specified data units in search key 456 in producing the value which will be used in matching the associative memory entries. Of course, various embodiments use different numbers of bits and bytes for modification mapping 450 and modification data 454. In one embodiment, modification mapping 450 includes an indication of the portion of search key 456 to modify (e.g., the value of J in one embodiment, the high-order bytes, the low order bytes, etc.).

Figure 4G:
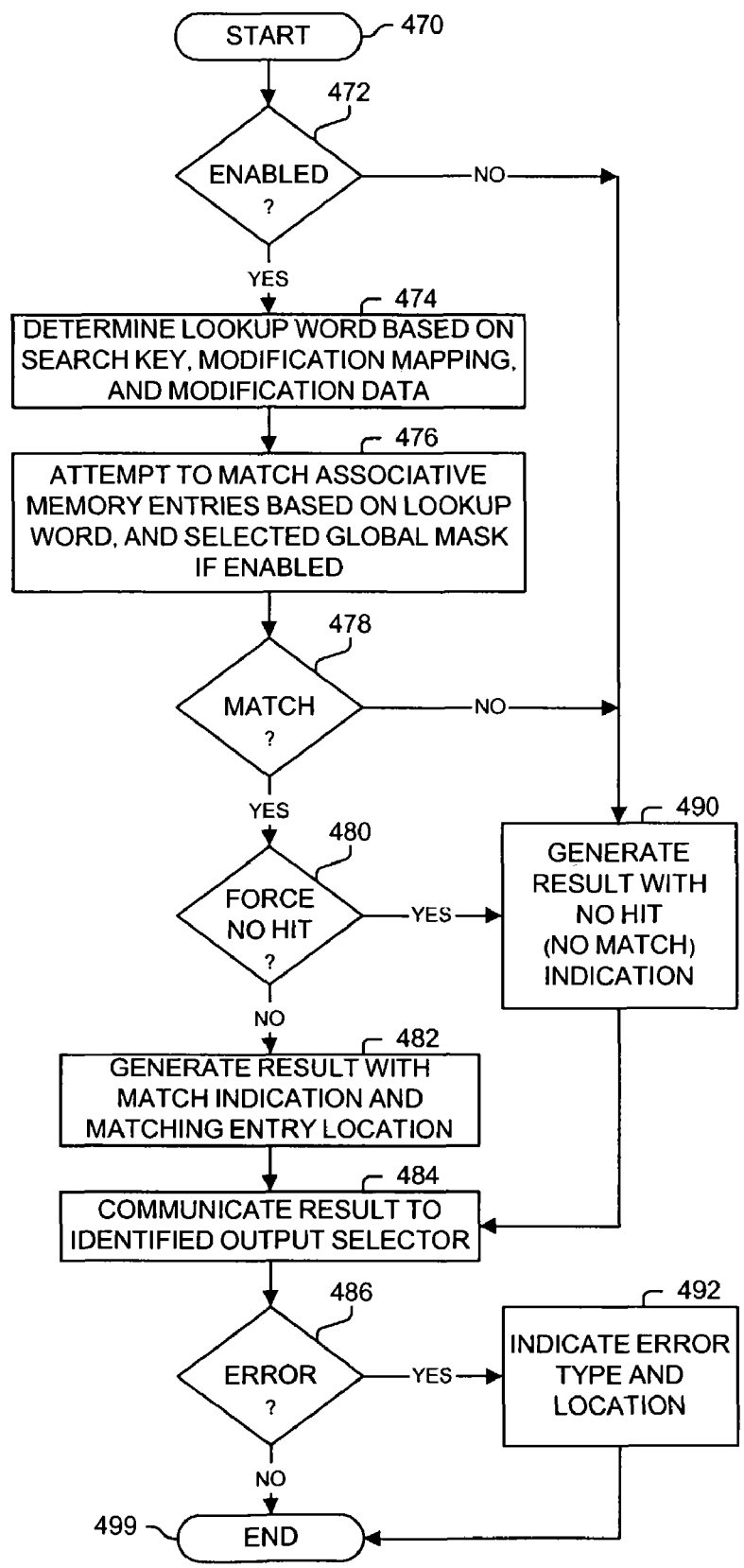

FIG. 4G illustrates an associative memory process used in one embodiment in performing a lookup operation. Processing begins with process block 470, and proceeds to process block 472. If the associative memory is not enabled, then processing proceeds to process block 490 wherein a result with a no hit indication is generated, and processing continues to process block 484. Otherwise, in process block 474, the lookup word is determined typically based on the search key, modification mapping, and modification data. Note, in one embodiment, the search key is used as the lookup word and there is no concept of a modification mapping or modification data. Next, in process block 476, the lookup word is used to match the associative memory entries with consideration of a selected and enabled global mask, if any. Note, in one embodiment, there is no concept of a global mask.

As determined in process block 478, if at least one match has been identified, then processing proceeds to process block 480, otherwise to process block 490, wherein a result with a no hit indication is generated and processing proceeds to process block 484. Otherwise, as determined in process block 480, if the highest priority matching entry includes a force no hit indication, then processing proceeds to process block 490, wherein a result with a no hit indication is generated and processing proceeds to process block 484. Otherwise, in process block 482, a result indicating a hit (i.e., successful match) with the highest priority matching entry identified is generated.

In process block 484, the result is communicated to at least the identified output selector or selectors. In one embodiment, the output selector to which to communicate the result is identified by output selector ID 335 (FIG. 3B). As determined in process block 486, if an error condition has been identified or received, then in process block 492, a signal is generated indicating the type and location of the error. In one embodiment, error indication 420 (FIG. 4C) is used. Processing is complete as indicated by process block 499.

Figure 5A:
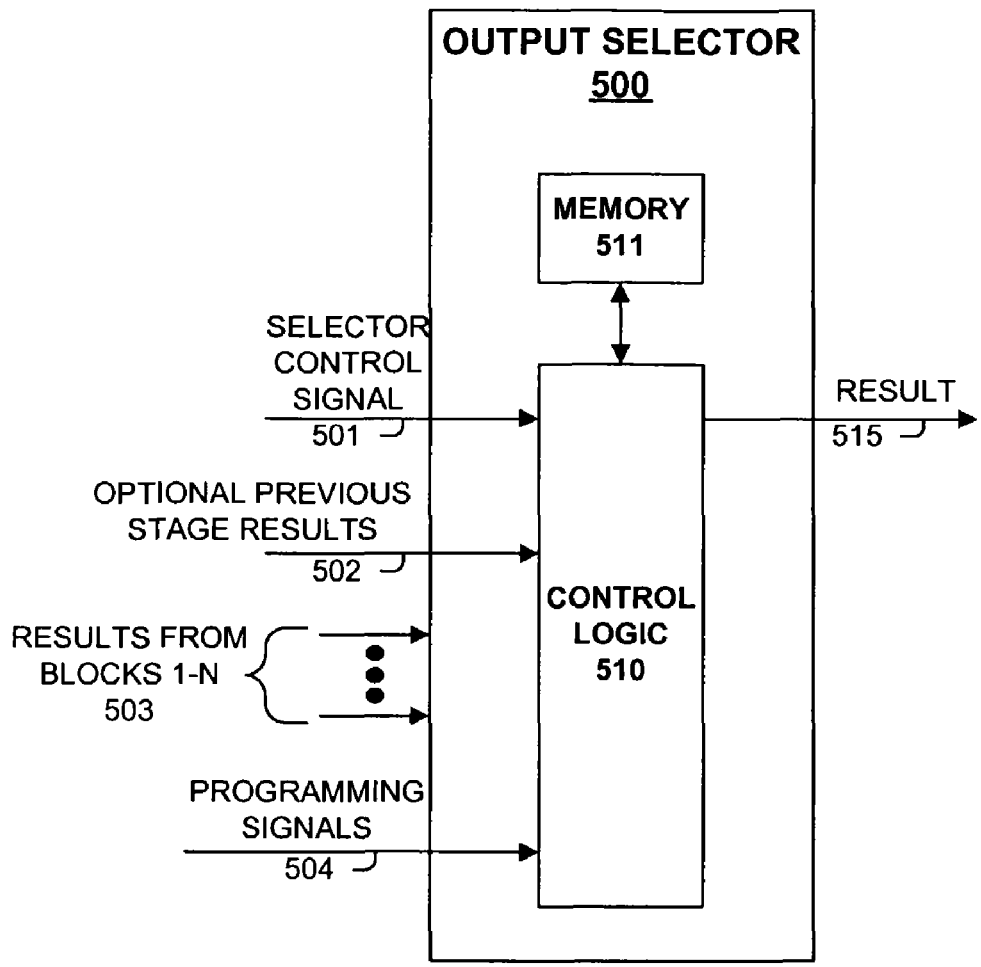
FIGS. 5A-C illustrate various aspects of an output selector used in one embodiment for performing lookup operations.

FIG. 5A illustrates of an output selector 500 (which may or may not correspond to an output selector 231-232 of FIG. 2) used in one embodiment. As shown, output selector 500 includes control logic 510 and memory 511. In one embodiment, programming signals 504 are received, and in response, one or more data structures in memory 511 are updated.

Figure 5B:
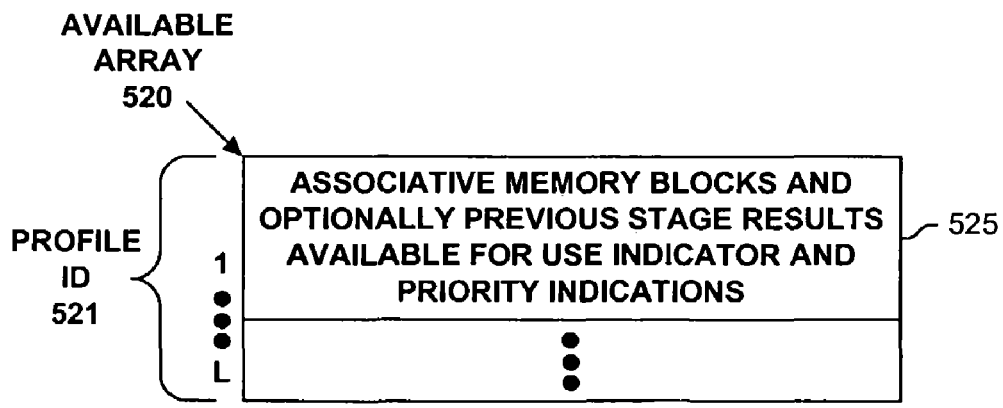

FIG. 5B illustrates one data structure used in one embodiment. Available array 520 is programmed with an associative memory blocks and optionally previous stage results available for use indicator 525 for each profile ID 521 to be used. Each indicator 525 identifies which, if any, associative memory blocks, sets of entries or associative memory banks are to be considered in determining which matching associative entry to select for the ultimate highest-priority matching associative memory entry. In one embodiment, indicator 525 further identifies which previous stage results to consider. In one embodiment, a priority level is associated with each of the banks and/or previous stage results. Thus, based on a profile ID 521 received over via selector control signal 501 (FIG. 5A), available array 520 can be retrieved from memory 511 (FIG. 5A). In one embodiment, there is an implied priority ordering of associative memory blocks and any previous stage results, while in one embodiment this priority ordering for determining the ultimate highest-priority matching entry is programmable and/or variable per lookup operation. In one embodiment, associative memory blocks available for use indicator 525 is a bitmap data structure, while in one embodiment, associative memory blocks available for use indicator 525 is a list, set, array, or any other data structure.

Returning to FIG. 5A, in the performance of a lookup operation, output selector 500 receives selector control signal 501, which may include a profile ID. In addition, output selector 500 receives any relevant previous stage results 502 and results 503 from zero or more of the associative memory blocks from which the highest-priority entry will be selected, and which, if any, will be identified in generated result 515.

Moreover, in one embodiment, selector control signal 501 including an enable indication, the enable indication including an enabled or not enabled value, such that in when a not enable value is received, output selector 500 is not enabled and does not select among results from blocks 1-N 503 or optional previous stage results 502. In one embodiment, when not enabled, output selector 500 generates a result signal 515 indicting a no hit, not enabled, or some other predetermined or floating value.

Additionally, in one embodiment, result 515 is communicated over a fixed output bus, which may or may not be multiplexed with other results 515 generated by other output selectors 500. In one embodiment, the associative memory may include one or more output buses, each typically connected to a single pin of a chip of the associative memory, with the selection of a particular output bus possibly being hardwired or configurable, with the configuration possibly being on a per lookup basis, such as that determined from a received value or configuration information retrieved from a memory (e.g., based on the current profile ID.) In such a configuration, control logic 510 (or other mechanism) typically selects which output bus (and the timing of sending result 515) to use for a particular or all results 515.

Figure 5C:
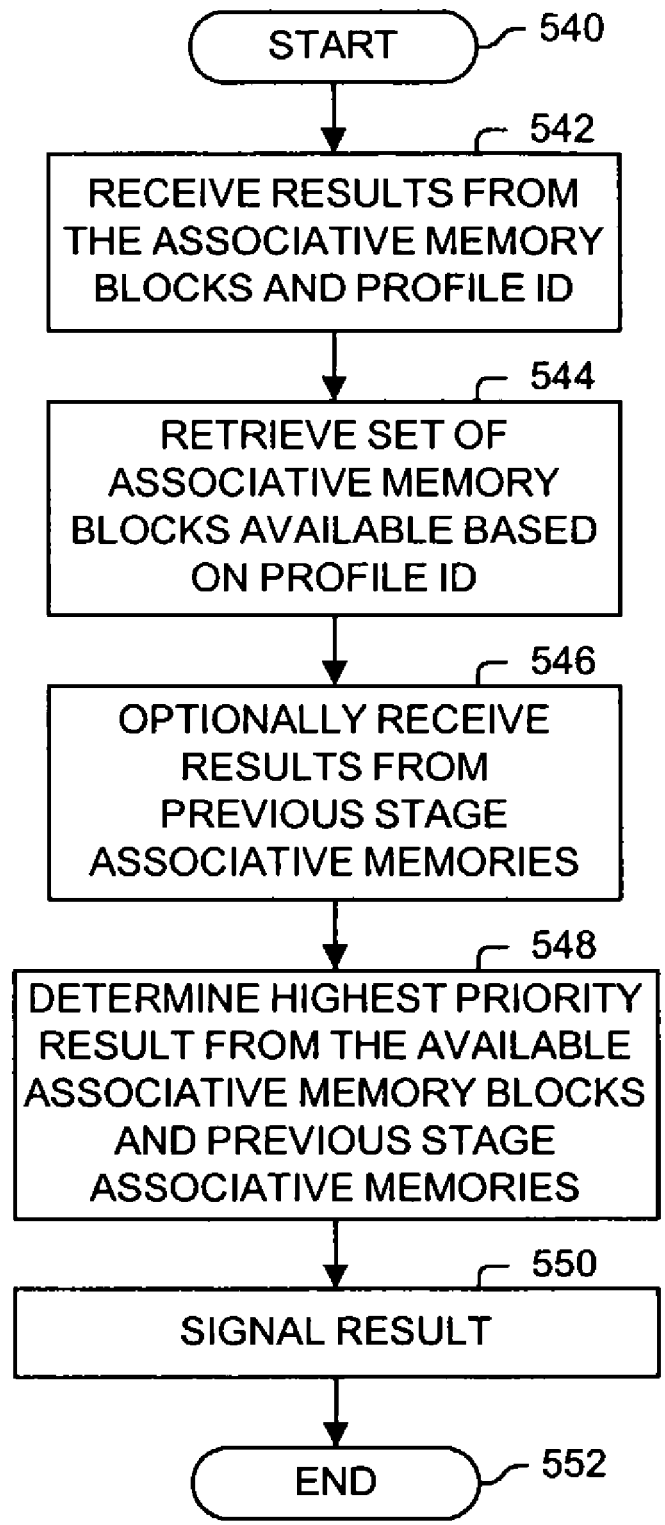

A process used in one embodiment for receiving and selecting a highest-priority associative memory entry, if any, is illustrated in FIG. 5C. Processing begins with process block 540, and proceeds to process block 542, wherein the results from the associative memory blocks and the profile ID are received. In process block 544, the set of associative memory blocks to consider in determining the result is retrieved from a data structure/memory based on the profile ID. In process block 546, any relevant previous stage results are received from coupled associative memories. Next, in process block 548, the highest priority match from the available associative memory block and previous stage results is identified, if any, based on the implied and/or programmed priority values associated with the matching entries and/or associative memories, blocks, etc. Then, in process block 550, the result is communicated over a fixed or identified output bus/pin or to some other destination, with the result typically including a no hit indication or a hit indication and an identification of the ultimate highest-priority matching associative memory entry. Processing is complete as indicated by process block 552.

FIG. 6A illustrates an exemplary policy map 600, including deny and permit instructions. Note, there are many applications of embodiments, and not all use permit and deny instructions. FIG. 6B illustrates associative memory entries 621 and 622 as determined by one embodiment based on policy map 600. Associative memory entries 621 and 622 could be programmed in a same or different associative memories or associative memory blocks. Associative memory entries 621 and 622 are shown in separate groupings to illustrate how priority can be optionally used and programmed in one embodiment. As shown, the deny statements in policy map 600 generate force no-hit indications (e.g., FORCE NO-HIT=1) in corresponding entries of entries 621 and 622.

By using the optional priority indications, entries 621 and 622 can be stored in different associative memories and/or associative memory banks, etc., to possibly consider in determining where to store the entries in order to efficiently use the space available for the entries. By associating a priority level with each entry, entries within a same associative memory and/or associate memory block, etc. can have different priority levels, which gives great flexibility in programming and managing the entries and space available for storing the entries.

Figure 6C:
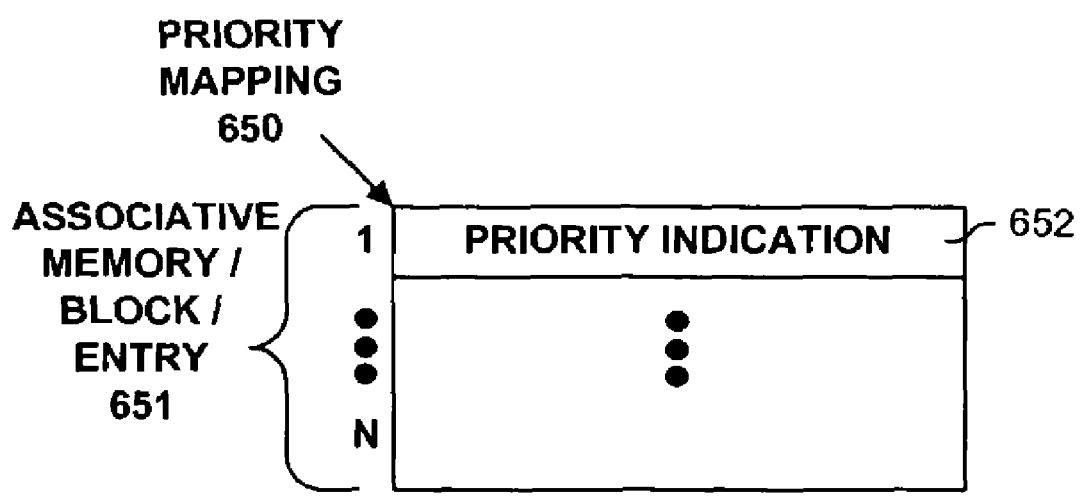
FIG. 6C illustrates a data structure for indicating priority of associative memories, blocks, or entries used in one embodiment.

FIG. 6C illustrates a data structure 650 for indicating priority of associative memories, blocks, or entries, etc. used in one embodiment. As shown, priority mapping data structure 650 provides a priority indication 652 (e.g., value) for each of the associative memories, associative memory blocks, associative memory entries, etc. (identified by indices 651). Associative memories and/or blocks, etc. associated with programmed priority values can be used with or without programmed priority values associated with the associative memory entries themselves.

Figure 7A:
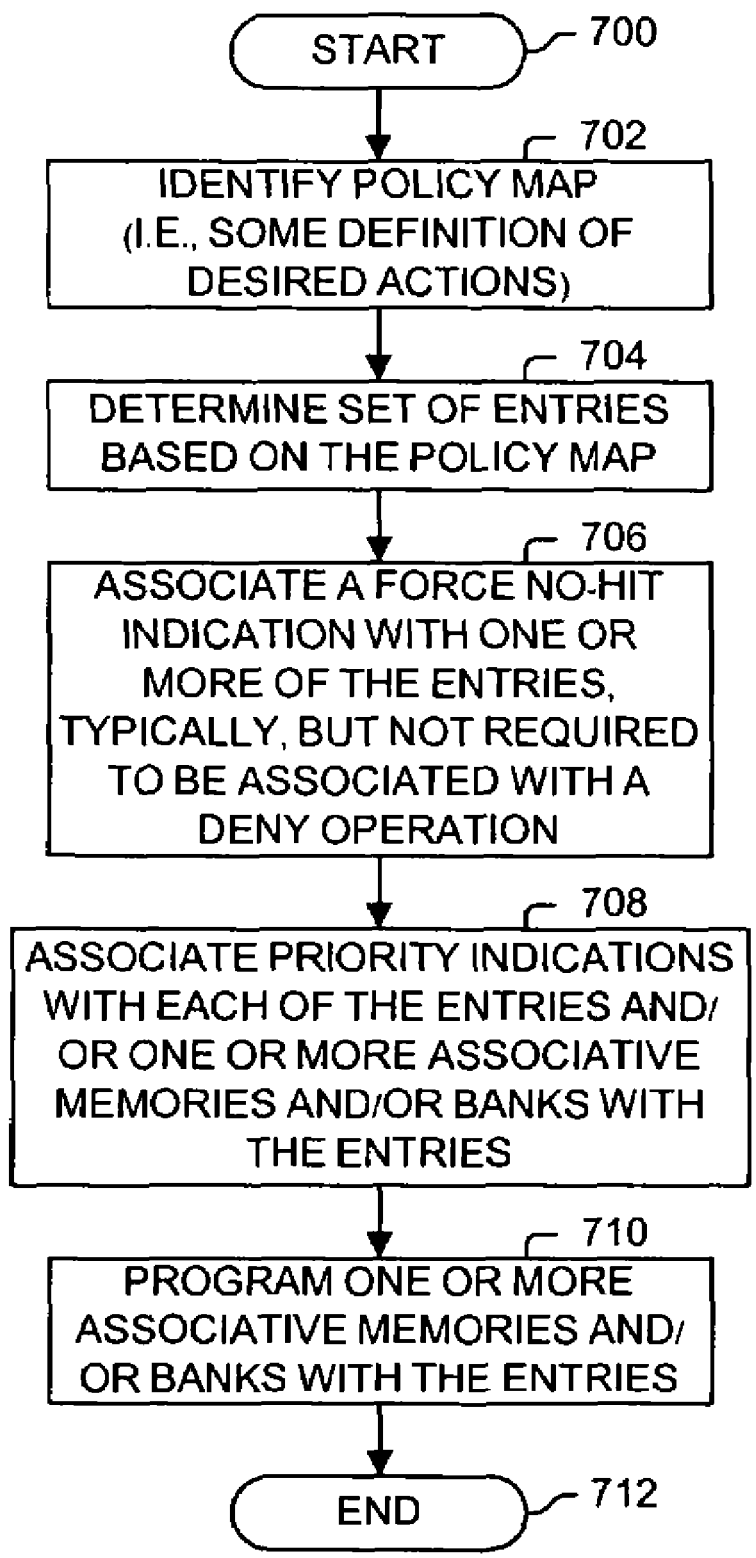
FIG. 7A illustrates a process for programming associative memory entries used in one embodiment.

FIG. 7A illustrates a process for programming associative memory entries used in one embodiment. Processing begins with process block 700, and proceeds to process block 702, wherein a policy map (e.g., any definition of desired actions, etc.) is identified. Next, in process block 704, a set of corresponding entries is identified based on the policy map. In process block 706, a force no-hit indication is associated with one or more of the entries (if so correspondingly defined by the policy map). A force no-hit indication is of particular use in implementing deny operations, but is not required to be identified with a deny operation. Next, in process block 708, optionally, priority indications are associated with each of the entries, associative memories, associative memory banks, etc. In process block 710, one or more associative memories and/or banks are programmed with the entries (and data structures updated as required). Processing is complete as indicated by process block 712.

Figure 7B:
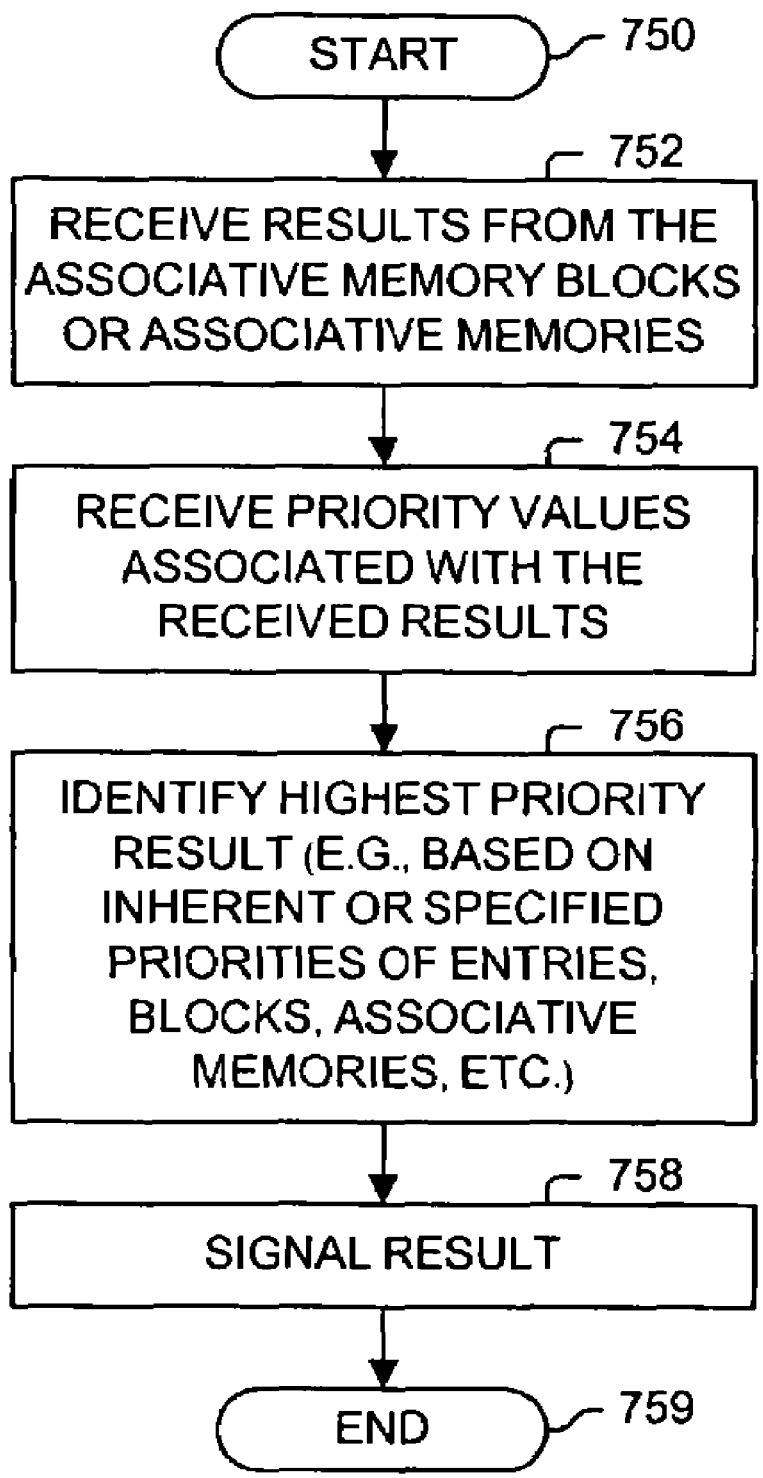
FIG. 7B illustrates a process for identifying a highest priority result used in one embodiment.

FIG. 7B illustrates a process for identifying a highest priority result used in one embodiment. Processing begins with process block 750, and proceeds to process block 752, wherein results are received from the associative memories, blocks, etc. (including possibly from previous stages). In process block 754, the priority values are associated with the results (e.g., based on the entries, memories, blocks, etc.). In process block 756, the highest priority result is (or in one embodiment, results are) identified based on the inherent or programmed priority values. The hierarchy (e.g., the order they are considered) of types of priority values (e.g., those associated with the entries, banks, memories, etc.) can vary among embodiments and even among individual lookup operations. In process block 758, the highest priority result is (or results are) identified. Processing is complete as indicated by process block 759.

Figure 8B:
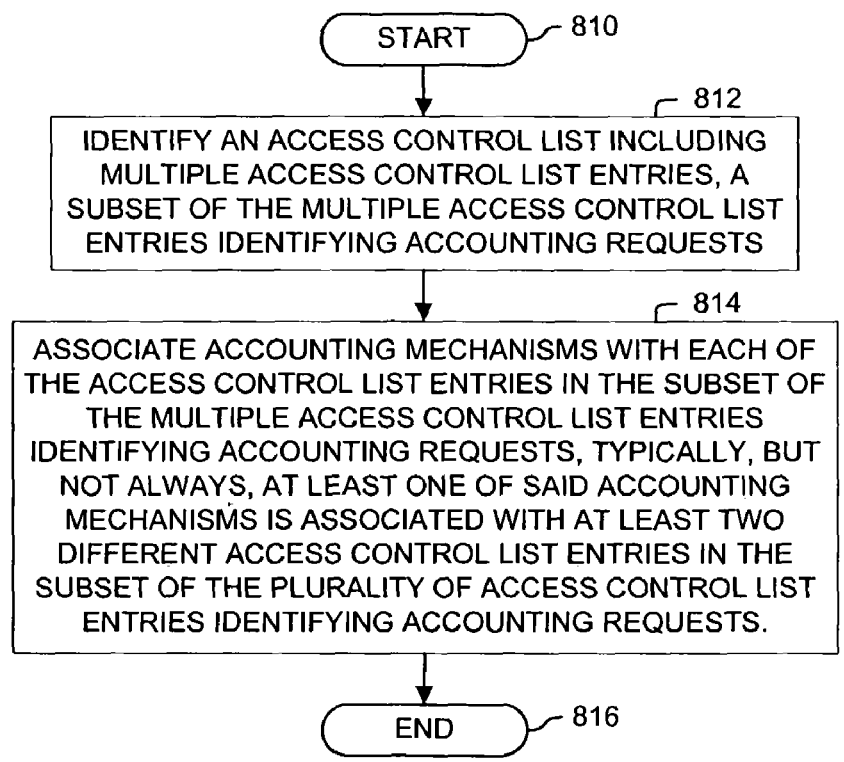

FIGS. 8A-G illustrate access control lists, processes, mechanisms, data structures, and/or other aspects of some of an unlimited number of systems employing embodiments for updating counters or other accounting devices, or for performing other functions. Shown in FIG. 8A is an access control list 800 which defines accounting information to be collected in a counting mechanism one by statement 801 for access control list entries 803 and in a counting mechanism two by statement 802 for access control list entries 804. Note, there are multiple access control entries in that will cause a same counting mechanism to be adjusted. Also, the value by which a particular counter is adjusted can be one (e.g., corresponding to one item or packet), a byte count (e.g., a size of an item, packet, frame, or datagram) or any other value.

FIG. 8B illustrates a process used in one embodiment to configure a mechanism for accumulating information based on access control entries. Note, this embodiment may be responsive to and/or implemented in computer-readable medium (e.g., software, firmware, etc.), custom hardware (e.g., circuits, ASICs, etc.) or via any other means or mechanism, such as, but not limited to that disclosed herein. For example, one embodiment uses a system described herein, and/or illustrated in FIGS. 1A-E, 2, 8D-8E, 9A, 9C-D, and/or any other figure.

Processing of the flow diagram illustrated in FIG. 8B begins with process block 810, and proceed to process block 812, wherein an access control list is identified. Typically, the access control list includes multiple access control list entries, with a subset of these entries identifying accounting requests. Next, in process block 814, accounting mechanisms are associated with each of the access control list entries specifying accounting requests. Typically, but not always, at least one of the accounting mechanisms is associated with at least two different access control list entries. Processing is complete as indicated by process block 816.

Figure 8C:
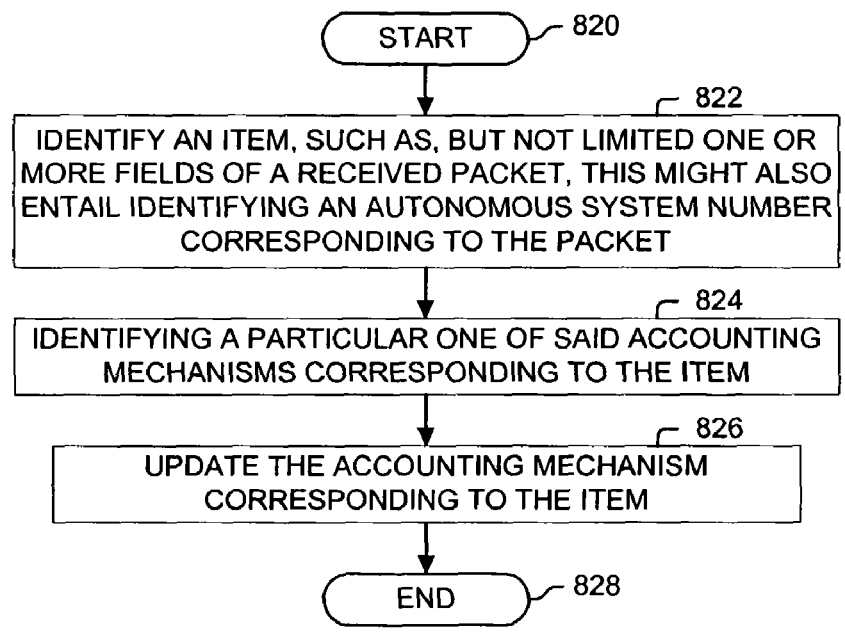

FIG. 8C illustrates a process used in one embodiment for updating an accounting mechanism based on an item, such as, but not limited to one or more fields or values associated with a packet. Processing begins with process block 820, and proceeds to process block 822, wherein an item is identified. The identification of an item might include identifying an autonomous system number corresponding to the packet. Note, an autonomous system number is typically associated with a set of communication devices under a single administrative authority. For example, all packets sent from an Internet Service Provide typically are associated with a same autonomous system number. Next, in process block 824, a particular one of the accounting mechanisms corresponding to the item is identified, such as by, but not limited to a lookup operation in a data structure, associative memory, or by any other means or mechanism. Then, in process block 826, the identified accounting mechanism is updated. Processing is complete as indicated by process block 828.

Figure 8D:
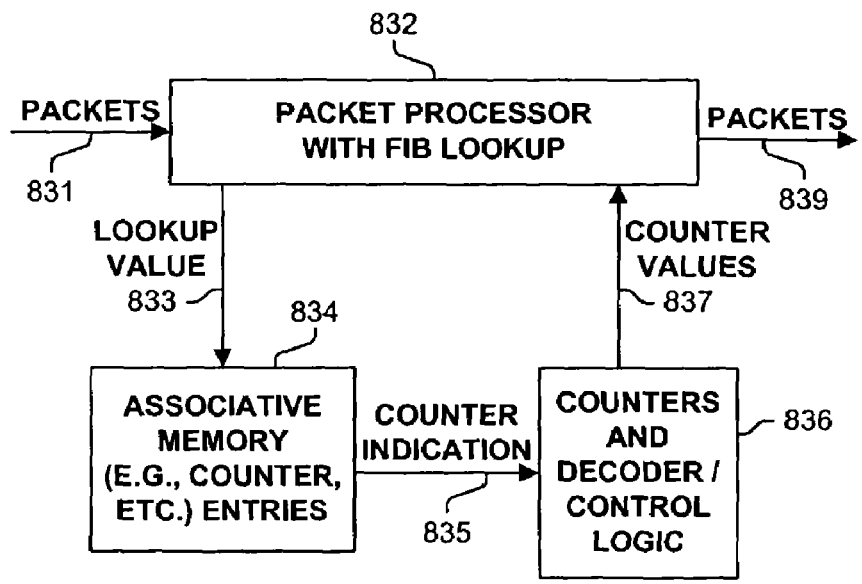

FIG. 8D illustrates one embodiment of a system for updating an accounting value based on that defined by an access control list or other mechanism. Packets 831 are received and processed by packet processor 832 to generate packets 839. In one embodiment, packet processor 832 performs a lookup operation in a forwarding information base (FIB) data structure to identify the source and/or destination autonomous system number associated with the identified packet.

Based on an identified packet, autonomous system numbers, and/or other information, a lookup value 833 is identified. FIG. 9G illustrates a lookup value 960 used in one embodiment. One embodiment uses all, less than all, or none of fields 960A-960I.

Based on lookup value 833, a lookup operation is performed in associative memory entries 834 in one or more associative memory banks and/or one or more associative memories to generate a counter indication 835. The corresponding counting mechanism within counters and decoder/control logic 836 is updated. Counter values 837 are typically communicated via any communication mechanism and/or technique to packet processor 832 or another device to be forwarded or processed.

Figure 8E:
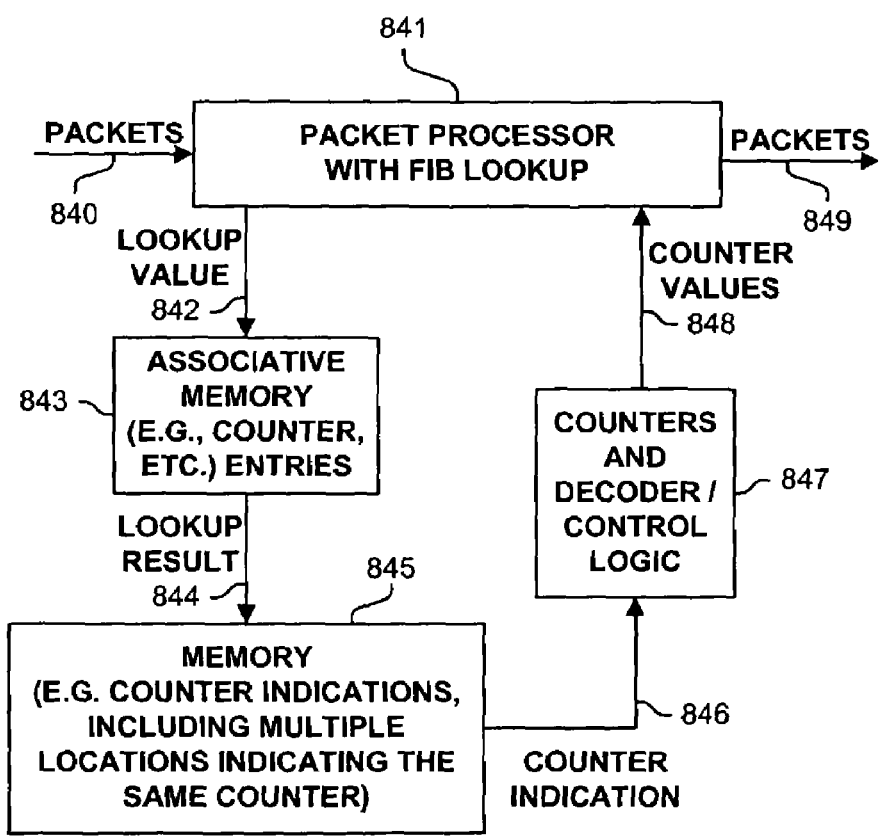

FIG. 8E illustrates one embodiment of a system for updating an accounting value based on that defined by an access control list or other mechanism. Packets 840 are received and processed by packet processor 841 to generate packets 849. In one embodiment, packet processor 841 performs a lookup operation in a forwarding information base (FIB) data structure to identify the source and/or destination autonomous system number associated with the identified packet.

Based on an identified packet, autonomous system numbers, and/or other information, a lookup value 842 is identified. FIG. 9G illustrates a lookup value 960 used in one embodiment. One embodiment uses all, less than all, or none of fields 960A-960I.

Based on lookup value 842, a lookup operation is performed in associative memory entries 843 in one or more associative memory banks and/or one or more associative memories to produce a lookup result 844, which is then used to perform a lookup operation in adjunct memory 845 generate a counter indication 846, and the corresponding counting mechanism within counters and decoder/control logic 847 is updated. In one embodiment, adjunct memory 845 stores counter indications for corresponding locations of access control list entries programmed in associative memory 843, and some of these counter indications may be the same value such that a same counting mechanism is updated for different matching access control list entries. Counter values 848 are typically communicated via any communication mechanism and/or technique to packet processor 841 or another device to be forwarded or processed.

Figure 8F:
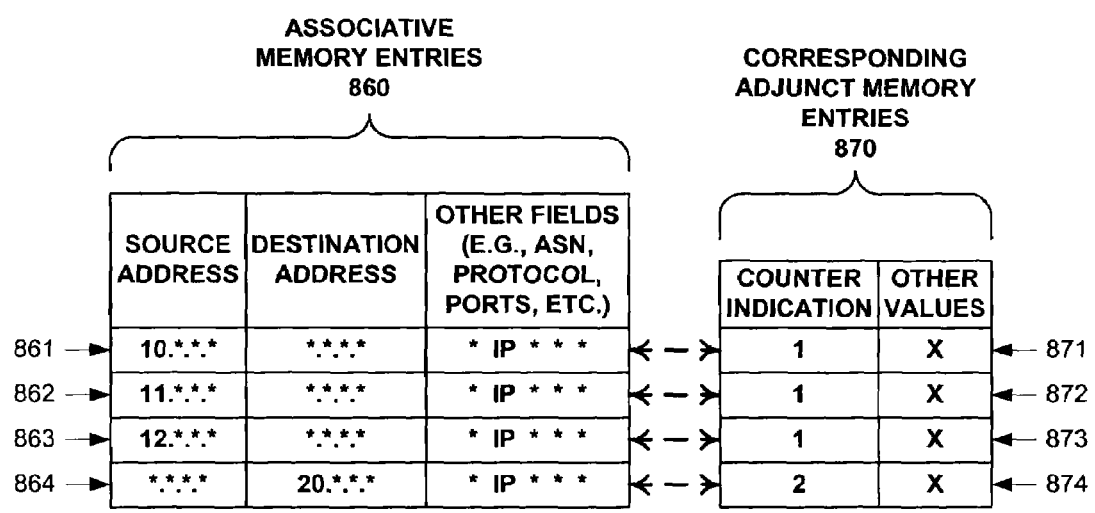

FIG. 8F illustrates an example of associative memory entries 860 and corresponding adjunct memory entries 870, such as those are generated by one embodiment based on access control list entries 803 and 804 (FIG. 8A). As shown, associative memory entries 861-863 have the same counter indication in adjunct memory entries 871-873, while associative memory entry 864 has a different corresponding counter indication in adjunct memory entry 874. In one embodiment, associative memory entries include fields for a source address, destination address, and other fields, such as, but not limited to autonomous system numbers (ASNs), protocol type, source and destination port information, etc. In one embodiment, adjunct memory entries 870 include an indication of a counting mechanism and/or other values which may be used for other purposes (e.g., security, routing, policing, quality of service, etc.).

Figure 8G:
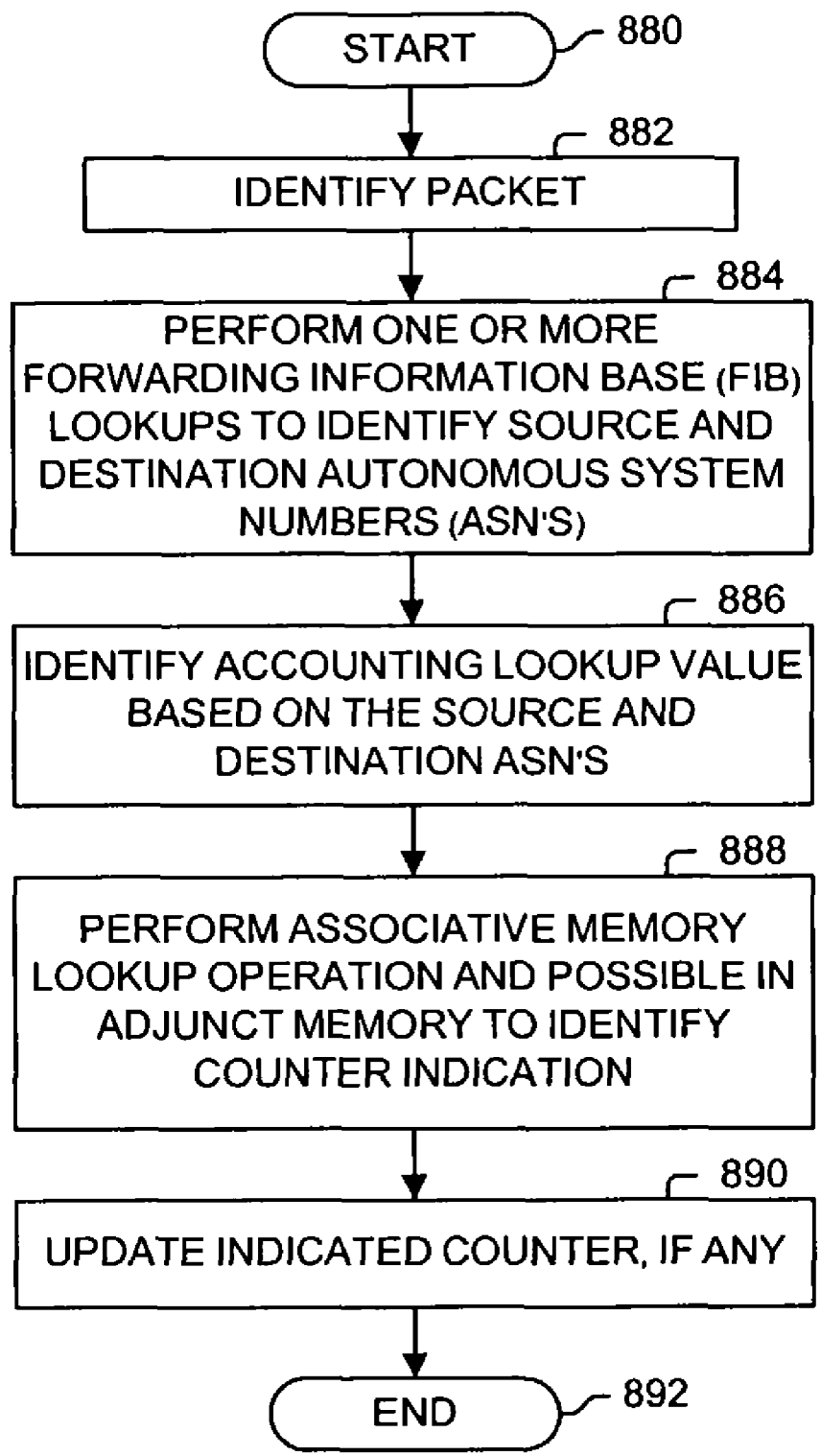

FIG. 8G illustrates a process used in one embodiment for processing a packet. Processing begins with process block 880, and proceeds to process block 882, wherein a packet is identified. Next, in process block 884, one or more forwarding information base (FIB) lookup operations are performed to identify source and destination autonomous system numbers corresponding to the identified packet. In process block 886, an accounting lookup value is identified, typically based on information contained in the identified packet and the source and destination ASNs. In process block 888, a lookup operation is performed in one or more associative memory banks and possibly in corresponding one or more adjunct memories to identify a counter indication. In process block 890, the counter, if any, corresponding to the counter indication is updated by some static or dynamic value. Processing is complete as indicated by process block 892.

Figure 9A:
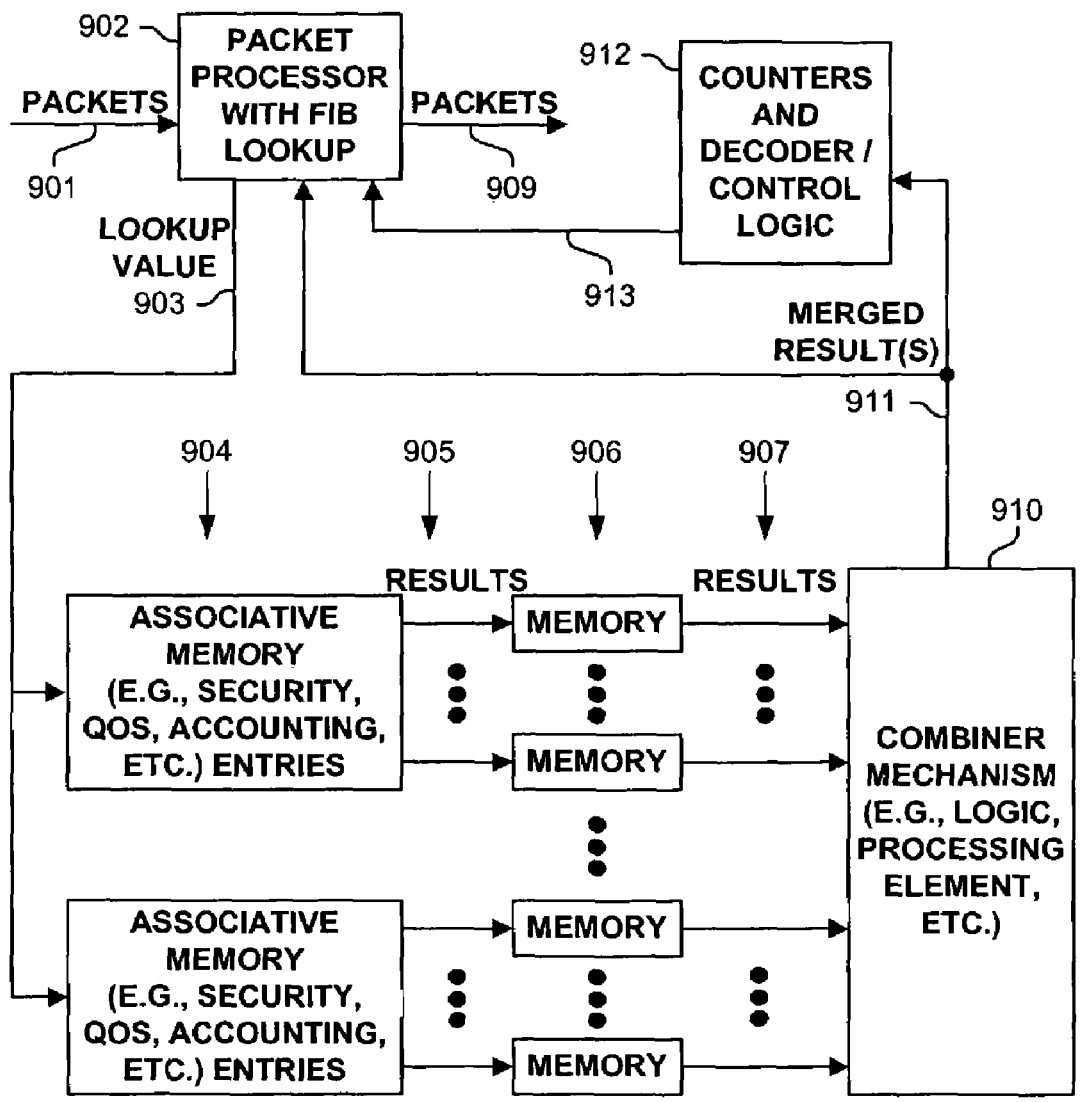

FIG. 9A illustrates one embodiment of a system for identifying a merged lookup result. Packets 901 are received and processed by packet processor 902 to generate packets 909. In one embodiment, packet processor 902 performs a lookup operation in a forwarding information base (FIB) data structure to identify the source and/or destination autonomous system number associated with the identified packet.

Based on an identified packet, autonomous system numbers, and/or other information, a lookup value 903 is identified. FIG. 9G illustrates a lookup value 960 used in one embodiment. One embodiment uses all, less than all, or none of fields 960A-960I.

Based on lookup value 903, a lookup operation is performed in associative memory entries 904 (e.g., access control list, security, quality of service, accounting entries) in multiple associative memory banks and/or one or more associative memories to generate a results 905, based on which, memories 906 generate results 907. Combiner mechanism 910 merges results 907 to produce one or more merged results 911, which are typically used by packet processor 902 in the processing of packets. In one embodiment, combiner mechanism 910 includes a processing element responsive to computer-readable medium (e.g., software, firmware, etc.), custom hardware (e.g., circuits, ASICs, etc.) and/or via any other means or mechanism. In one embodiment, a merged result 911 includes a counter indication which is used by counters and decoder/control logic 912 to update a value. The accumulated accounting values 913 are typically communicated to packet processor 902 or another device.

FIG. 9B illustrates an access control list 915, including access control list entries of multiple features of a same type. For example, entries 916 correspond to security entries such as the packet that should be dropped or processed, while entries 917 correspond to packets that should or should not be sent to a mechanism to encrypt the packet. Different associative memories are each programmed with associative memory entries corresponding to a different one of the features. A lookup operation is then performed substantially simultaneously on each of feature sets of associative memory entries to generate associative memory results, which are then used to perform lookup operations substantially simultaneously in adjunct memories to produce the lookup results which then can be merged to produce the merged result. The respective priorities of the lookup results may be implicit based on that corresponding to their respective associative memory banks and/or adjunct memories, or be specified, such as in the associative memory entries, from another data structure lookup operation, or identified using any other manner or mechanism.

For example, one embodiment includes four associative memory banks for supporting one to four features. An associative memory lookup operation is performed in parallel on the four banks and then in the adjunct memories (SRAMs), which indicate the action, type of entry (e.g., ACL, QoS, Accounting), and precedence for combiner mechanism. The combiner mechanism merges the results to get the final merged result. A miss in an ACL lookup in a bank is treated as a permit with lowest precedence. If in more than one bank there is a hit with same specified precedence in the retrieved adjunct memory entry, the precedence used by the combiner mechanism is determined based on the implied or specified precedence of the associative memory bank. If there is a miss in all the banks, default result is used from global registers. A similar merge operation is performed for the QoS and accounting lookup results.

Figure 9C:
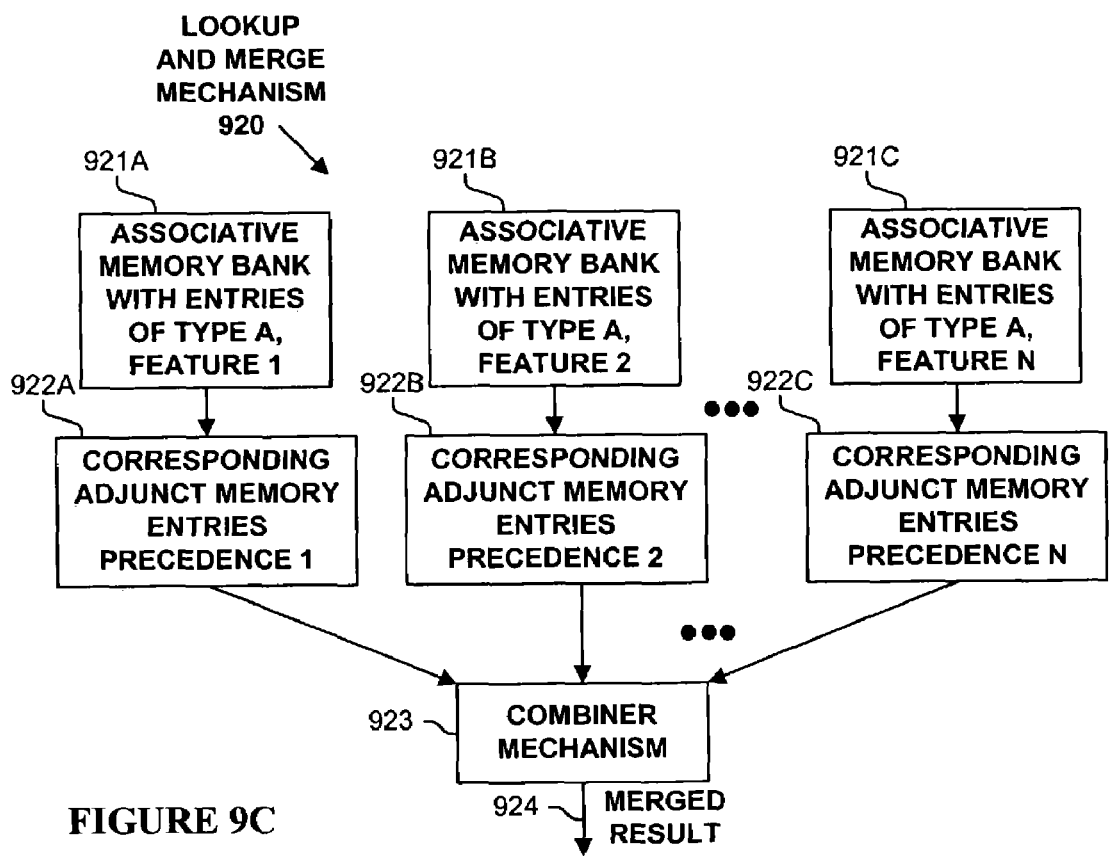

FIG. 9C illustrates a lookup and merge mechanism 920 used by one embodiment. One or more of associative memory banks 921A-921C (there can be any number of banks) are programmed with associative memory entries of a same access control list type, with different features of the type programmed into a different one of the associative memory banks 921A-921C. Corresponding adjunct memory entries 922A-922C are programmed in one or more adjunct memories. Thus, lookup operations can be performed substantially simultaneously on associative memory banks 921A-C to generate results, which are used to identify corresponding lookup results from adjunct memory entries 922A-922C, which are then merged by combiner mechanism 923 to generate the merged result 924.

Figure 9D:
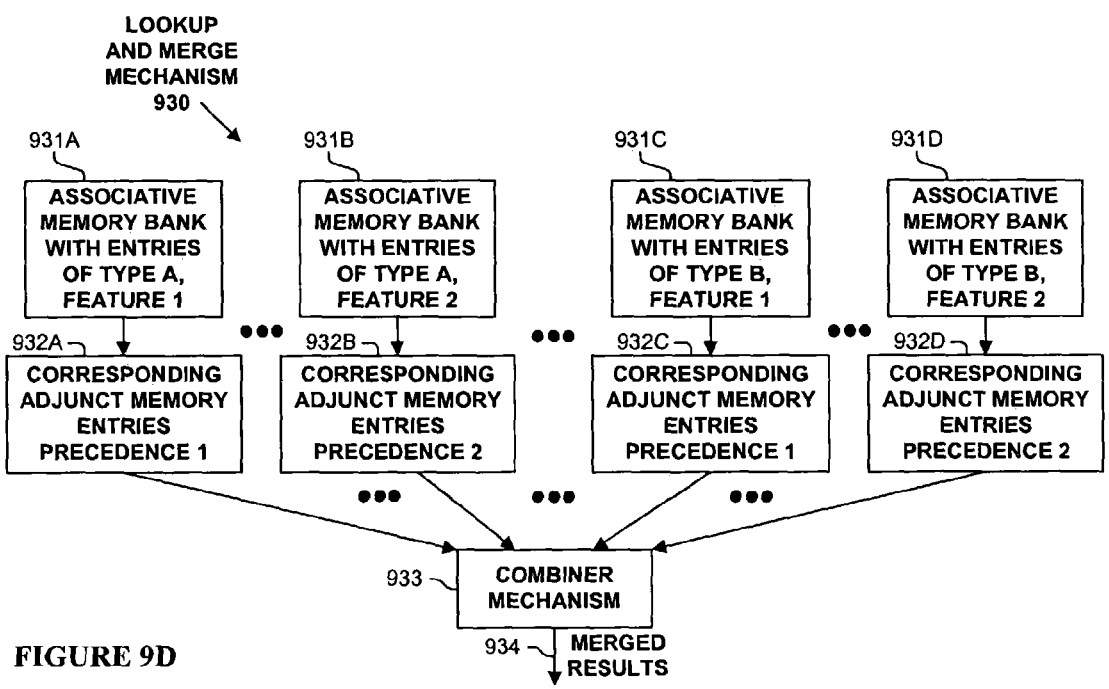

FIG. 9D is substantially similar to that of FIG. 9C, but illustrates that multiple merged results corresponding to multiple access control list entry types can be generated in parallel (e.g., substantially simultaneously). As shown, lookup and merge mechanism 920, used by one embodiment, is programmed with features sets of a same type in associative memory banks 931A-931B (there can be any number of banks), and of a different type in associative memory banks 931C-931D (there can be any number of banks). Corresponding adjunct memory entries 932A-932D are programmed into one or more adjunct memories. Thus, lookup operations can be performed substantially simultaneously on associative memory banks 921A-D to generate results, which are used to identify corresponding lookup results from adjunct memory entries 922A-922D, which are then merged by combiner mechanism 933 to generate the multiple merged results 934 (e.g., typically one or more merged result per access control list type).

Figure 9E:
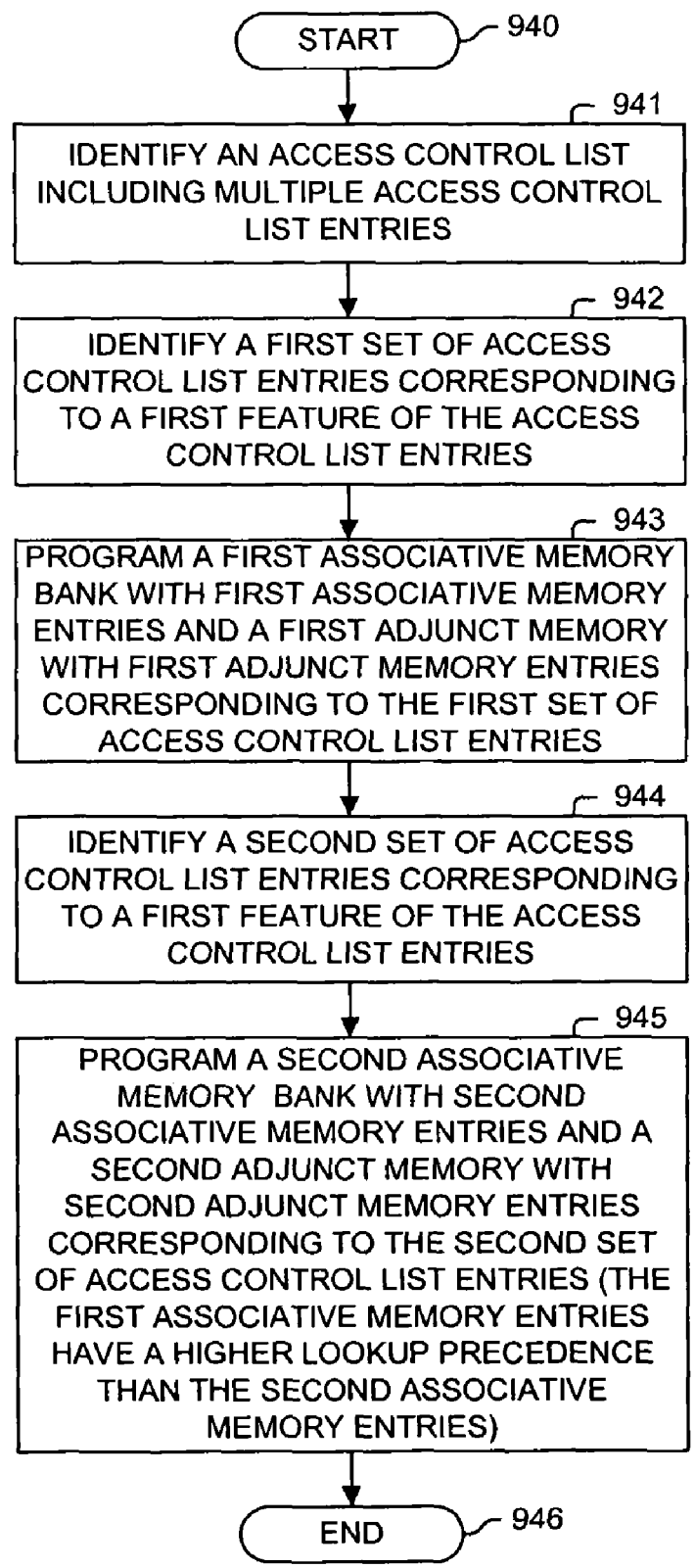

FIG. 9E illustrates a process used in one embodiment to program the associative and adjunct memories in one embodiment. Processing begins with process block 940, and proceeds to process block 941, wherein an access control list including multiple access control list entries is identified. In process block 942, a first set of the access control list entries corresponding to a first feature of the access control list entries is identified. In process block 943, a first associative memory bank and a first adjunct memory are programmed with entries corresponding to the first set of access control list entries. In process block 944, a second set of the access control list entries corresponding to a second feature of the access control list entries is identified. In process block 945, a second associative memory bank and a second adjunct memory are programmed with entries corresponding to the second set of access control list entries. The first set of associative memory entries have a higher lookup precedence than the second set of associative memory entries. Processing is complete as indicated by process block 946.

Figure 9F:
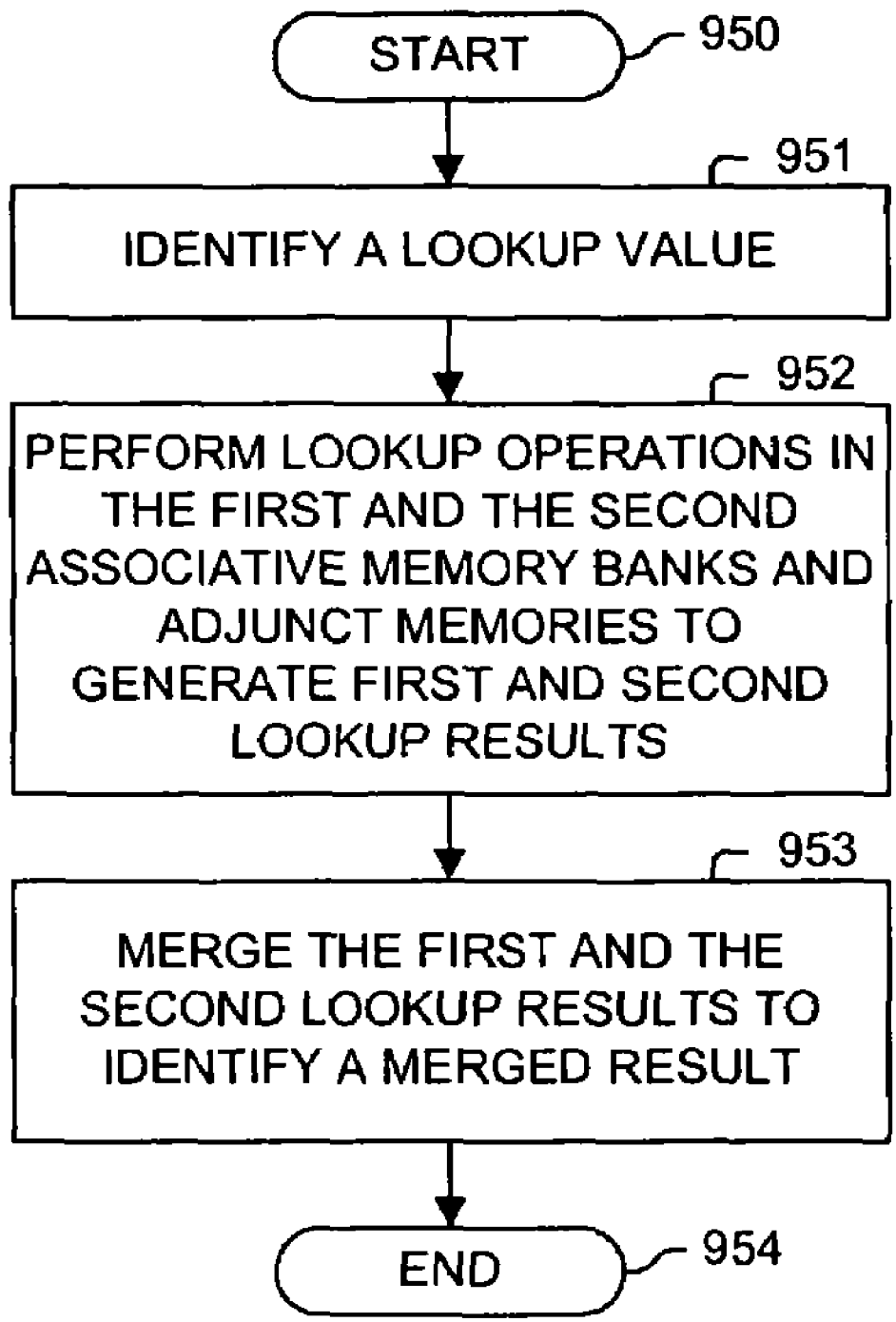
Figure 9G:
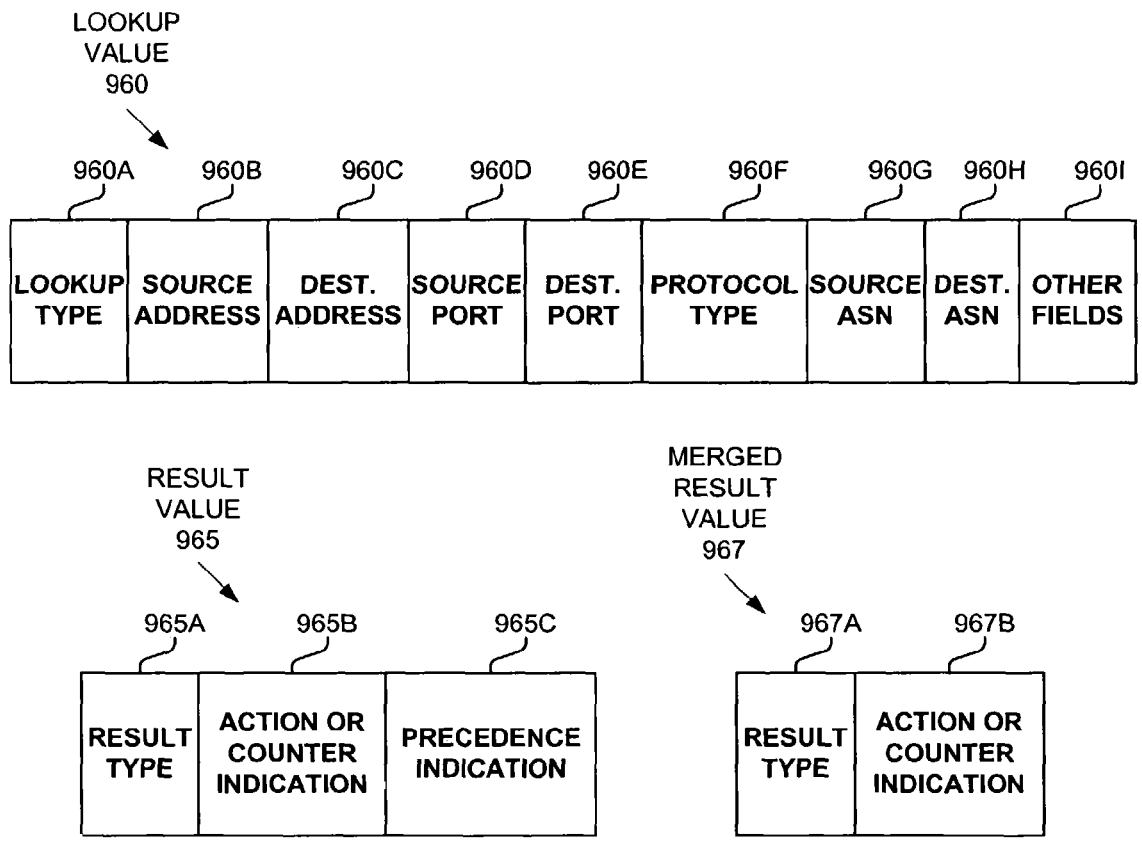

FIG. 9F illustrates a process used by one embodiment to perform lookup operations and to identify the merged result. Processing begins with process block 950, and proceeds to process block 951, wherein a lookup value is identified. Next, in process block 952, lookup operations are performed in the first and second associative memory banks and adjunct memories to generate first and second lookup results, which are merged in process block 953 to identify the merged result. Processing is complete as indicated by process block 954.

FIG. 9G illustrates a lookup value 960, result value 965, and merged result value 967 used in one embodiment. As shown, lookup value 960 includes a lookup type 960A, source address 960B, destination address 960C, source port 960D, destination port 960E, protocol type 960F, source ASN 960G, destination ASN 960H, and possibly other fields 960I. One embodiment uses all, less than all, or none of fields 960A-960I.

As shown, result value 965 includes a result type 965A, an action or counter indication 965B, and a precedence indication 965C. In one embodiment, result value 965 is programmed in the adjunct memories. One embodiment uses all, less than all, or none of fields 965A-965C.

As shown, merged result value 967 includes a result type 967A and an action or counter indication 967B. One embodiment uses all, less than all, or none of fields 967A-967B.

Figure 9J:
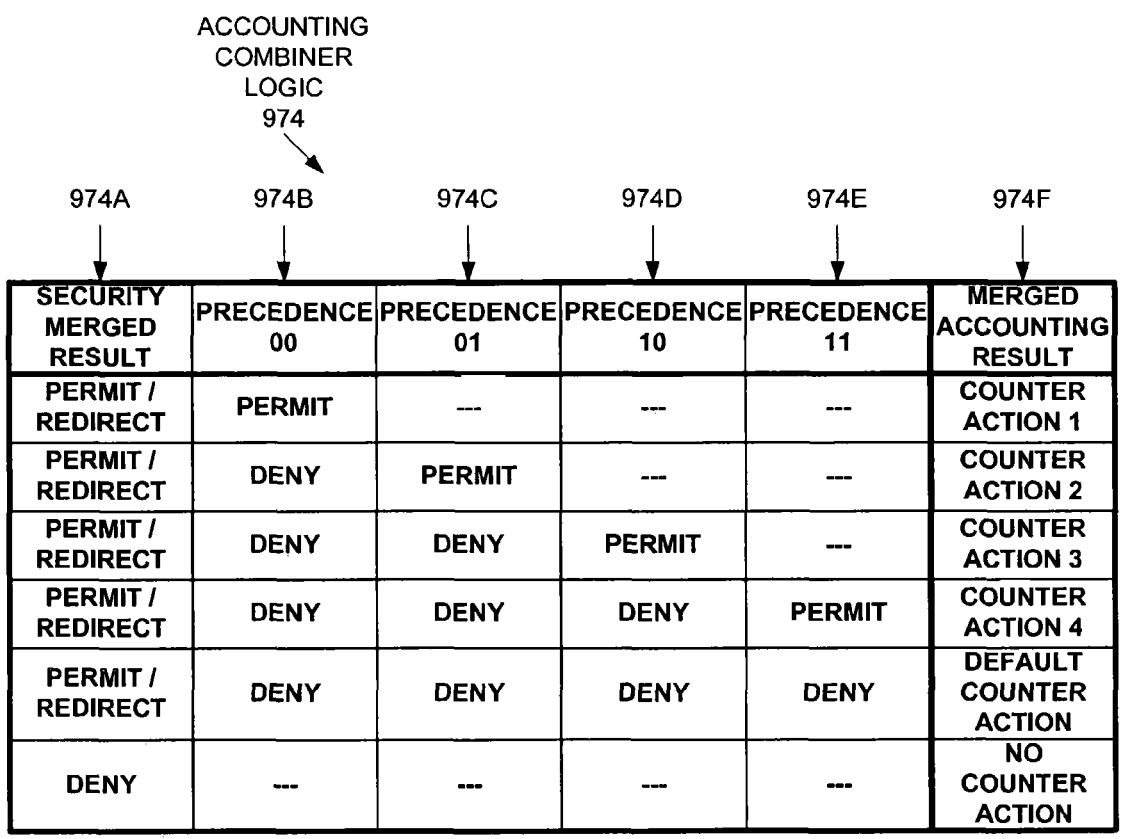

FIGS. 9H-9J illustrate merging logic truth tables 970, 972, and 974 for generating the merged result. In one embodiment, the merge result of a security lookup operation is illustrated in security combiner logic 970, and is based on the results of up to four substantially simultaneous (or not) lookup operations with differing precedence indicated in columns 970A-970D, with the corresponding merged result shown in column 970E. Note, the "- - -" in the fields indicate a don't care condition as a merged result corresponding to a higher priority will be selected.

In one embodiment, the merge result of a Quality of Service (QoS) lookup operation is illustrated in security combiner logic 972, and is based on the results of a previously merged security lookup operation and up to four substantially simultaneous (or not) lookup operations with differing precedence indicated in columns 972A-970E, with the corresponding merged result shown in column 972F.

In one embodiment, the merge result of an accounting lookup operation is illustrated in accounting combiner logic 972, and is based on the results of a previously merged security lookup operation and up to four substantially simultaneous (or not) lookup operations with differing precedence indicated in columns 974A-974E, with the corresponding merged result shown possibly identifying a counter to be updated in column 972F.

Figure 9K:
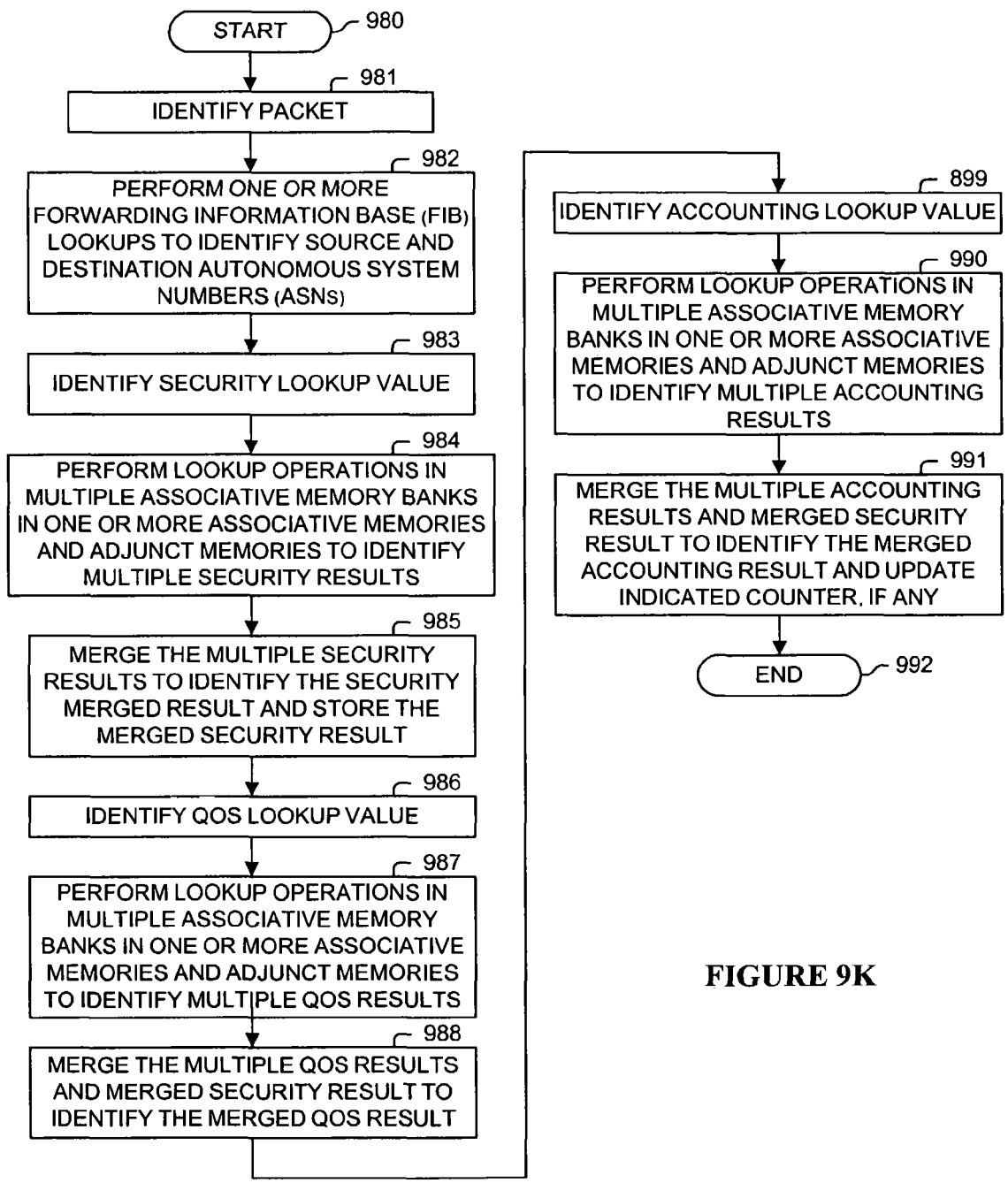

FIG. 9K illustrates a process used in one embodiment, to generate a security merged result, a QoS merged result, and an accounting merged result. Processing begins with process block 980, and proceeds to process block 981, wherein a packet is identified. Next, in process block 982, one or more FIB lookup operations are performed to identify source and destination ASNs. In process block 983, a security lookup value is identified. In process block 984, lookup operations are performed based on the security lookup value in multiple associative memory banks and one or more adjunct memories to identify multiple security results, which are merged in process block 985 to identify the merged security result. Also, this merged security result is stored in a data structure or other mechanism for use in identifying the merged QoS and accounting results.

In process block 986, the QoS lookup value is identified. In process block 987, lookup operations are performed based on the QoS lookup value in multiple associative memory banks and one or more adjunct memories to identify multiple QoS results, which, in process block 988, are merged along with the previously determined merged security result to identify the merged QoS result.

In process block 989, the accounting lookup value is identified. In process block 990, lookup operations are performed based on the accounting lookup value in multiple associative memory banks and one or more adjunct memories to identify multiple accounting results, which, in process block 991, are merged along with the previously determined merged security result to identify the merged accounting result. Also, an identified counter or other accounting mechanism is updated. Processing is complete as indicated by process block 992.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
configuring a mechanism for accumulating information based on an access control list including a plurality of access control list entries, with one or more of the plurality of access control list entries identifying network accounting data collection requests; said configuring the mechanism including: associating network accounting data collection mechanisms with each of said one or more of the plurality of access control list entries identifying network accounting data collection requests; and wherein the access control list identifies to a bridge or a router information for allowing and denying flows of packet traffic, with at least one of the plurality of access control list entries identifies a deny operation and at least one of the plurality of access control list entries identifies a permit operation; and employing the bridge or the router to perform the following operations: for each particular item of a plurality of items: identifying a particular network accounting data collection mechanism of said network accounting data collection mechanisms corresponding to the particular item based on matching the particular item with said one or more of the plurality of access control list entries; and in response, updating the particular network accounting data collection mechanism corresponding to the particular item;

wherein each item of the plurality of items includes one or more fields of a corresponding received packet; and wherein said operation of identifying the particular network accounting data collection mechanism of said network accounting data collection mechanisms corresponding to the particular item includes: performing a lookup operation in an associative memory based on the lookup value including the particular item to identify an associative memory result; and performing a lookup operation on an adjunct memory based on the associative memory result to identify the particular network accounting data collection mechanism of said network accounting data collection mechanisms.

2. The method of claim 1, wherein each item of the plurality of items further includes at least one autonomous system number, said at least one autonomous system number identifying a set of communication devices under a single administrative authority.

3. The method of claim 1, wherein at least one of said network accounting data collection mechanisms is associated with at least two different access control list entries in said one or more of the plurality of access control list entries identifying network accounting data collection requests.

4. An apparatus, comprising:
one or more processors and memory, wherein the memory stores one or more instructions that, when executed by said one or more processors, perform operations comprising: configuring a mechanism for accumulating information based on an access control list including a plurality of access control list entries, with one or more of the plurality of access control list entries identifying network accounting data collection requests; said configuring the mechanism including: associating network accounting data collection mechanisms with each of said one or more of the plurality of access control list entries identifying network accounting data collection requests; and wherein the access control list identifies to a bridge or router information for allowing and denying flows of packet traffic, with at least one of the plurality of access control list entries identifies a deny operation and at least one of the plurality of access control list entries identifies a permit operation; and means for: for each particular item of a plurality of items: identifying a particular network accounting data collection mechanism of said network accounting data collection mechanisms corresponding to the particular item based on matching the particular item with said one or more of the plurality of access control list entries; and in response, updating the particular network accounting data collection mechanism corresponding to the particular item;

wherein the apparatus is the bridge or the router; and wherein each item of the plurality of items includes one or more fields of a corresponding received packet; and wherein said means for identifying the particular network accounting data collection mechanism of said network accounting data collection mechanisms corresponding to the particular item includes: means for performing a lookup operation in an associative memory based on the lookup value including the particular item to identify an associative memory result; and means for performing a lookup operation on an adjunct memory based on the associative memory result to identify the particular network accounting data collection mechanism of said network accounting data collection mechanisms.

5. The apparatus of claim 4, wherein each item of the plurality of items further includes at least one autonomous system number, said at least one autonomous system number identifying a set of communication devices under a single administrative authority.

6. The apparatus of claim 4, wherein at least one of said network accounting data collection mechanisms is associated with at least two different access control list entries in said one or more of the plurality of access control list entries identifying network accounting data collection requests.

7. An apparatus, comprising:

means for configuring a mechanism for accumulating information based on an access control list including a plurality of access control list entries, with one or more of the plurality of access control list entries identifying network accounting data collection requests; said means for configuring the mechanism including: means for associating network accounting data collection mechanisms with each of said one or more of the plurality of access control list entries identifying network accounting data collection requests; and wherein the access control list identifies to a bridge or router information for allowing and denying flows of packet traffic, with at least one of the plurality of access control list entries identifies a deny operation and at least one of the plurality of access control list entries identifies a permit operation; and means for: for each particular item of a plurality of items: identifying and a particular network accounting data collection mechanism of said network accounting data collection mechanisms corresponding to the particular item based on matching the particular item with said one or more of the plurality of access control list entries; and in response, updating the particular network accounting data collection mechanism corresponding to the particular item;

wherein the apparatus is the bridge or the router; and wherein each item of the plurality of items includes one or more fields of a corresponding received packet; and wherein said means for identifying the particular network accounting data collection mechanism of said network accounting data collection mechanisms corresponding to the particular item includes: means for performing a lookup operation in an associative memory based on the lookup value including the particular item to identify an associative memory result; and means for performing a lookup operation on an adjunct memory based on the associative memory result to identify the particular network accounting data collection mechanism of said network accounting data collection mechanisms.

8. The apparatus of claim 7, wherein each item of the plurality of items further includes at least one autonomous system number, said at least one autonomous system number identifying a set of communication devices under a single administrative authority.

9. The apparatus of claim 7, wherein at least one of said network accounting data collection mechanisms is associated with at least two different access control list entries in said one or more of the plurality of access control list entries identifying network accounting data collection requests.

* * * * *

UNITED STATES PATENT AND TRADEMARK OFFICE
CERTIFICATE OF CORRECTION

PATENT NO. : 7,689,485 B2
APPLICATION NO. : 10/630178
DATED : March 30, 2010
INVENTOR(S) : Kanekar et al.

It is certified that error appears in the above-identified patent and that said Letters Patent is hereby corrected as shown below:

Col. 26, line 11, Claim 7, replace "identifying and a particular network"
with -- identifying a particular network --

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,689,485 B2 | |
| APPLICATION NO. | : 10/630178 | |
| DATED | : March 30, 2010 | |
| INVENTOR(S) | : Kanekar et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1260 days.

Signed and Sealed this
Fifteenth Day of March, 2011

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,689,485 B2 |
| APPLICATION NO. | : 10/630178 |
| DATED | : March 30, 2010 |
| INVENTOR(S) | : Kanekar et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1724 days.

Signed and Sealed this
Nineteenth Day of April, 2011

David J. Kappos
*Director of the United States Patent and Trademark Office*